United States Patent
Chen et al.

(10) Patent No.: US 10,354,452 B2
(45) Date of Patent: Jul. 16, 2019

(54) DIRECTIONAL AND X-RAY VIEW TECHNIQUES FOR NAVIGATION USING A MOBILE DEVICE

(71) Applicant: QUALCOMM Incorporated, San Diego, CA (US)

(72) Inventors: Jiajian Chen, San Jose, CA (US); Hui Chao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/919,721

(22) Filed: Mar. 13, 2018

(65) Prior Publication Data

US 2018/0204386 A1 Jul. 19, 2018

Related U.S. Application Data

(63) Continuation of application No. 13/777,861, filed on Feb. 26, 2013, now Pat. No. 9,959,674.

(51) Int. Cl.
*G06F 3/01* (2006.01)
*G01C 21/20* (2006.01)
(Continued)

(52) U.S. Cl.
CPC .......... *G06T 19/006* (2013.01); *G01C 21/206* (2013.01); *G06F 3/011* (2013.01); *G06F 3/0346* (2013.01); *G09G 2340/10* (2013.01)

(58) Field of Classification Search
CPC ...... G06T 19/006; G06F 3/011; G06F 3/0346; G09G 2340/10; G01C 21/206
See application file for complete search history.

(56) References Cited

U.S. PATENT DOCUMENTS 7,893,963 B2  2/2011  Gallagher et al.
8,223,012 B1  7/2012  Diem
(Continued)

FOREIGN PATENT DOCUMENTS

CN  101379369 A  3/2009
EP  2228625 A2  9/2010
(Continued)

OTHER PUBLICATIONS

Mulloni A., et al., "Indoor Positioning and Navigation with Camera Phones", IEEE Pervasive Computing, IEEE Service Center, Los Alamitos, CA, US, vol. 8, No. 2, Apr. 1, 2009, pp. 22-31, XP011255510, ISSN: 1536-1268.
(Continued)

*Primary Examiner* — Maurice L. McDowell, Jr.
*Assistant Examiner* — Donna J. Ricks
(74) *Attorney, Agent, or Firm* — Polsinelli

(57) ABSTRACT

Techniques for displaying navigation information on a mobile device are provided that include a method that includes obtaining an indication of a position and an indication of a direction associated with the mobile device, using the indication of the position, the indication of the direction, information regarding identities of POIs within a geographic region of interest, and information regarding areas associated with the POIs to determine at least one relevant POI, of the POIs, that is associated with the position and direction, and displaying at least one visual indication associated with each of the at least one relevant POI on the mobile device. The appearance of the at least one visual indication is dependent on at least one of a distance from the mobile device of the relevant POI associated with the visual indication or presence of a known physical barrier between the mobile device and that relevant POI.

33 Claims, 11 Drawing Sheets

Projecting Eye Ray

X-Ray View

(51) Int. Cl.
*G06T 19/00* (2011.01)
*G06F 3/0346* (2013.01)

(56) References Cited

U.S. PATENT DOCUMENTS

| | | | |
|---|---|---|---|
| 8,848,970 B2 | 9/2014 | Aller et al. | |
| 2006/0213386 A1 | 9/2006 | Funakura | |
| 2006/0259574 A1 | 11/2006 | Rosenberg | |
| 2007/0160942 A1 | 7/2007 | Chen | |
| 2007/0162942 A1* | 7/2007 | Hamynen | G06F 17/3087 725/105 |
| 2008/0268876 A1* | 10/2008 | Gelfand | G06Q 30/02 455/457 |
| 2009/0171570 A1 | 7/2009 | Chiba | |
| 2009/0228201 A1 | 9/2009 | Liu | |
| 2009/0315776 A1 | 12/2009 | Khosravy et al. | |
| 2010/0268451 A1 | 10/2010 | Choi | |
| 2011/0178708 A1 | 7/2011 | Zhang et al. | |
| 2011/0273575 A1* | 11/2011 | Lee | G01C 21/20 348/222.1 |
| 2011/0287811 A1 | 11/2011 | Mattila et al. | |
| 2011/0306304 A1 | 12/2011 | Forutanpour et al. | |
| 2012/0105475 A1 | 5/2012 | Tseng | |
| 2012/0143500 A1 | 6/2012 | Taylor | |
| 2012/0154425 A1 | 6/2012 | Kim | |
| 2012/0176410 A1 | 7/2012 | Meier et al. | |
| 2012/0194547 A1 | 8/2012 | Johnson et al. | |
| 2012/0259732 A1 | 10/2012 | Sasankan et al. | |
| 2012/0264457 A1 | 10/2012 | Khosravy et al. | |
| 2013/0045751 A1 | 2/2013 | Chao et al. | |
| 2013/0093787 A1 | 4/2013 | Fulks et al. | |
| 2013/0095855 A1 | 4/2013 | Bort | |
| 2014/0240350 A1 | 8/2014 | Chen et al. | |
| 2015/0049080 A1 | 2/2015 | Purayil et al. | |
| 2015/0332505 A1* | 11/2015 | Wang | G06T 15/06 345/633 |
| 2016/0086384 A1* | 3/2016 | Stroila | G06T 11/60 345/633 |

FOREIGN PATENT DOCUMENTS

| | | |
|---|---|---|
| JP | 2006304265 A | 11/2006 |
| JP | 2010210257 A | 9/2010 |
| JP | 2010266256 A | 11/2010 |
| WO | 2012125269 A1 | 9/2012 |
| WO | 2014094881 A1 | 6/2014 |

OTHER PUBLICATIONS

"An Augmented Reality X-Ray System Based on Visual Saliency (ISMAR 2010)", Oct. 10, 2010 (Oct. 10, 2010), XP054975375, Retrieved from the Internet: URL:https://www.youtube.com/watch?v=du72tgJxrPY#t=119.

Avery B, "X-Ray Vision for Mobile Outdoor Augmented Reality", X-Ray Vision for Mobile Outdoor Augmented Reality, University of South Australia, Adelaide, South Australia May 31, 2009 (May 31, 2009), pp. I-XIX,1, XP002716488, Retrieved from the Internet: URL:http://ura.unisa.edu.au/R/?func=dbin-jump-full&object_id=56780.

International Search Report and Written Opinion—PCT/US2014/011788—ISA/EPO—dated Apr. 22, 2014.

Second Written Opinion from International Application No. PCT/US2014/011788, dated Nov. 14, 2014, 9 Pages.

* cited by examiner

Mobile Device

Mobile Device

Navigation Server

Location Server

Displaying Navigation Information

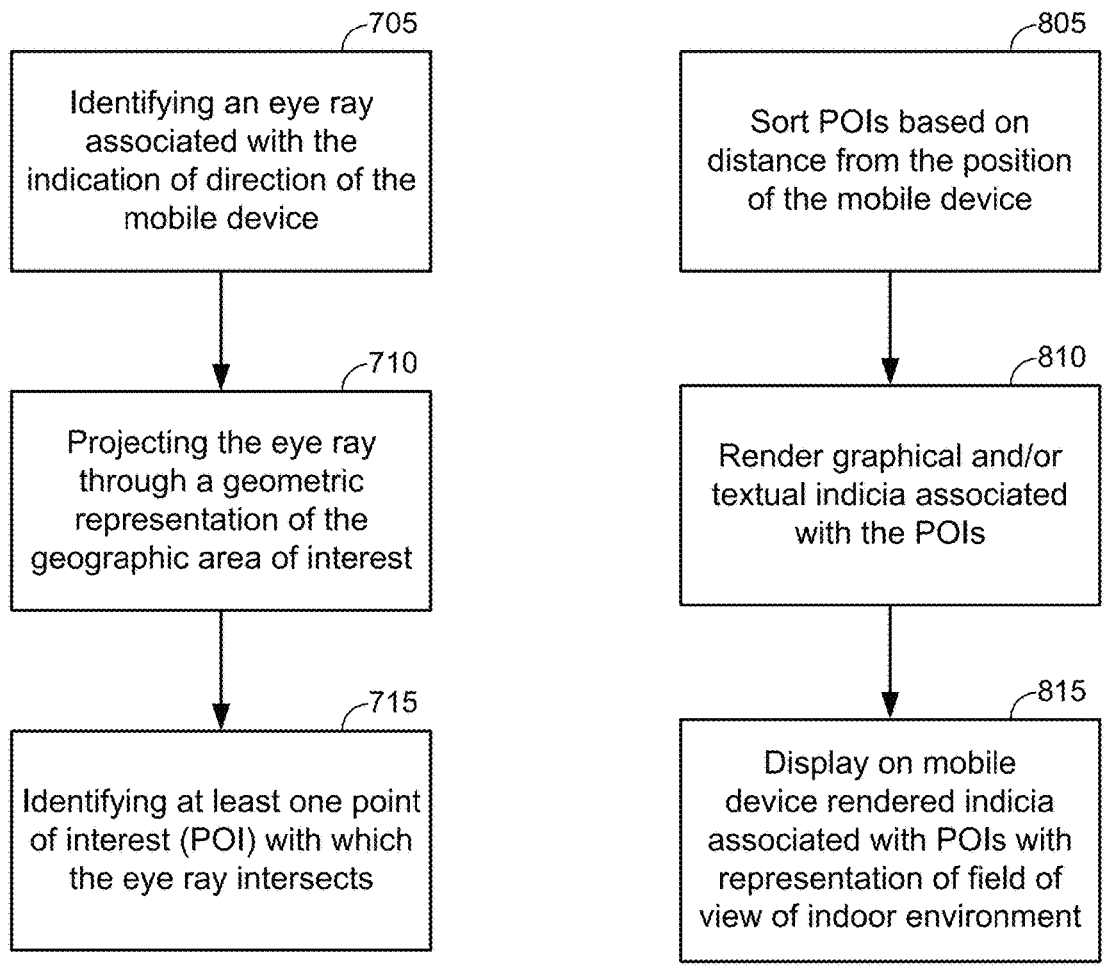

X-Ray View

Directional View

Projecting Eye Ray

View of Corridor

View of Inside of Store

X-Ray View

DIRECTIONAL AND X-RAY VIEW TECHNIQUES FOR NAVIGATION USING A MOBILE DEVICE

CROSS-REFERENCE TO RELATED APPLICATIONS

This application is a Continuation of U.S. application Ser. No. 13/777,861, filed Feb. 26, 2013, which is hereby incorporated by reference, in its entirety and for all purposes.

BACKGROUND

Indoor navigation presents issues different from outdoor navigation. For example, in complex indoor environments with large open spaces, such as large departments stores or sports stadiums, navigation may be different than in outdoor environments, e.g., because "streets" or "hallways" may not be well defined, and a user may be permitted to move freely or nearly so. Providing directional guidance to a user in an indoor environment using outdoor environment techniques may therefore not work well.

SUMMARY

An example method of displaying navigation information on a mobile device according to the disclosure includes obtaining, at the mobile device, an indication of a position of the mobile device, obtaining, at the mobile device, an indication of a direction associated with the mobile device, using the indication of the position of the mobile device, the indication of the direction associated with the mobile device, information regarding identities of points of interest within a geographic region of interest, and information regarding areas associated with the points of interest to determine at least one relevant point of interest, of the points of interest, that is associated with the position and direction of the mobile device, and displaying at least one visual indication associated with each of the at least one relevant point of interest on the mobile device. An appearance of the at least one visual indication for each of the at least one relevant point of interest is dependent on at least one of a distance from the mobile device of the relevant point of interest associated with the visual indication or presence of a known physical barrier between the mobile device and that relevant point of interest associated with the visual indication.

Implementations of such a method may include one or more of the following features. The at least one visual indication associated with each of the at least one relevant point of interest has at least one of a size or a transparency of the visual indication dependent on the distance from the mobile device of the relevant point of interest. The using further comprises determining a first relevant point of interest at a first different distance from the mobile device and a second relevant point of interest at a second different distance from the mobile device that is greater than the first distance, and the displaying further comprises displaying first and second visual indications corresponding to the first and second relevant points of interest, respectively, with the first visual indication being at least one of larger or less transparent than the second visual indication. The at least one visual indication associated with each of the at least one relevant point of interest has a transparency of the visual indication dependent on the presence of the known physical barrier between the mobile device and the relevant point of interest, and wherein the relevant point of interest is disposed beyond the known physical barrier relative to the mobile device and the visual indication is transparent. The geographic area of interests comprises an indoor environment. Using the indication of the position of the mobile device, the indication of the direction associated with the mobile device, information regarding identities of points of interest within a geographic region of interest, and information regarding areas associated with the points of interest to determine the at least one relevant point of interest, of the points of interest, that is associated with the position and direction of the mobile device includes: identifying at least one eye ray associated with the position of the mobile device and the indication of direction of the mobile device; projecting the eye ray through a geometric representation of the indoor environment; and identifying at least one point of interest with which the eye ray intersects as the at least one relevant point of interest. Displaying the at least one visual indication associated with each of the at least one relevant point of interest on the mobile device includes: sorting the at least one relevant point of interest based on a distance of each of the at least one relevant point of interest from the position of the mobile device; rendering at least one visual indication associated with each of the relevant points of interest; and displaying the at least one visual indication associated with each of the at least one relevant point of interest and a representation of a field of view of a camera of the mobile device. The at least one visual indication associated with each of the at least one relevant point of interest has at least one of a size or a transparency of the visual indication dependent on the distance from the mobile device of the relevant point of interest. Displaying the at least one visual indication associated with each of the at least one relevant point of interest on the mobile device includes: sorting the at least one relevant point of interest based on a distance of each of the at least one relevant point of interest from the position of the mobile device; determining an alpha channel value for each of the at least one relevant point of interest based on a distance of the at least one relevant point of interest from the position of the mobile device; generating composite image content based on a graphical indications associated with each of the at least one relevant point of interest and the alpha channel value associated with each of the at least one relevant point of interest; and displaying the composite image content on a display of the mobile device. The graphical indications associated with each of the at least one point of interest comprises an image of the relevant point of interest associated with the graphical indications.

An example apparatus for displaying navigation information on a mobile device according to the disclosure includes: means for obtaining, at the mobile device, an indication of a position of the mobile device; means for obtaining, at the mobile device, an indication of a direction associated with the mobile device; means for using the indication of the position of the mobile device, the indication of the direction associated with the mobile device, information regarding identities of points of interest within a geographic region of interest, and information regarding areas associated with the points of interest to determine at least one relevant point of interest, of the points of interest, that is associated with the position and direction of the mobile device; and means for displaying a visual indication for each of the at least one relevant point of interest on the mobile device. An appearance of the visual indication for each of the at least one relevant point of interest is dependent on at least one of a distance from the mobile device of the relevant point of interest associated with the visual indication or presence of a known physical barrier between the mobile device and that relevant point of interest associated with the visual indication.

Implementations of such an apparatus may include one or more of the following features. The at least one visual indication associated with each of the at least one relevant point of interest has at least one of a size or a transparency of the visual indication dependent on the distance from the mobile device of the relevant point of interest. The means for using includes means for determining a first relevant point of interest at a first different distance from the mobile device and a second relevant point of interest at a second different distance from the mobile device that is greater than the first distance, and the means for displaying further includes means for displaying first and second visual indications corresponding to the first and second relevant points of interest, respectively, with the first visual indication being at least one of larger or less transparent than the second visual indication. The at least one visual indication associated with each of the at least one relevant point of interest has a transparency of the visual indication dependent on the presence of the known physical barrier between the mobile device and the relevant point of interest, and the relevant point of interest is disposed beyond the known physical barrier relative to the mobile device and the visual indication is transparent. The geographic area of interests comprises an indoor environment. The means for using the indication of the position of the mobile device, the indication of the direction associated with the mobile device, information regarding identities of points of interest within a geographic region of interest, and information regarding areas associated with the points of interest to determine the at least one relevant point of interest, of the points of interest, that is associated with the position and direction of the mobile device includes: means for identifying at least one eye ray associated with the position of the mobile device and the indication of direction of the mobile device; means for projecting the eye ray through a geometric representation of the indoor environment; and means for identifying at least one point of interest with which the eye ray intersects as the at least one relevant point of interest. The means for displaying the at least one visual indication associated with each of the at least one relevant point of interest on the mobile device includes: means for sorting the at least one relevant point of interest based on a distance of each of the at least one relevant point of interest from the position of the mobile device; means for rendering at least one visual indication associated with each of the relevant points of interest; and means for displaying the at least one visual indication associated with each of the at least one relevant point of interest and a representation of a field of view of a camera of the mobile device. The at least one visual indication associated with each of the at least one relevant point of interest has at least one of a size or a transparency of the visual indication dependent on the distance from the mobile device of the relevant point of interest. The means for displaying the at least one visual indication associated with each of the at least one relevant point of interest on the mobile device includes: means for sorting the at least one relevant point of interest based on a distance of each of the at least one relevant point of interest from the position of the mobile device; means for determining an alpha channel value for each of the at least one relevant point of interest based on a distance of the at least one relevant point of interest from the position of the mobile device; means for generating composite image content based on a graphical indications associated with each of the at least one relevant point of interest and the alpha channel value associated with each of the at least one relevant point of interest; and means for displaying the composite image content on a display of the mobile device. The graphical indications associated with each of the at least one point of interest comprises an image of the relevant point of interest associated with the graphical indications.

An example non-transitory computer-readable medium according to the disclosure, has stored thereon computer-readable instructions for displaying navigation information on a mobile device. The instructions are configured to cause a computer to obtain, at the mobile device, an indication of a position of the mobile device; obtain, at the mobile device, an indication of a direction associated with the mobile device; use the indication of the position of the mobile device, the indication of the direction associated with the mobile device, information regarding identities of points of interest within a geographic region of interest, and information regarding areas associated with the points of interest to determine at least one relevant point of interest, of the points of interest, that is associated with the position and direction of the mobile device; and display at least one visual indication associated with each of the at least one relevant point of interest on the mobile device. An appearance of the at least one visual indication for each of the at least one relevant point of interest is dependent on at least one of a distance from the mobile device of the relevant point of interest associated with the visual indication or presence of a known physical barrier between the mobile device and that relevant point of interest associated with the visual indication.

Implementations of such a non-transitory computer-readable medium may include one or more of the following features. The at least one visual indication associated with each of the at least one relevant point of interest has at least one of a size or a transparency of the visual indication dependent on the distance from the mobile device of the relevant point of interest. The instructions configured to cause the computer to use include instructions to cause the computer to determine a first relevant point of interest at a first different distance from the mobile device and a second relevant point of interest at a second different distance from the mobile device that is greater than the first distance, and the instructions to cause the computer to display include instructions to cause the computer to display first and second visual indications corresponding to the first and second relevant points of interest, respectively, with the first visual indication being at least one of larger or less transparent than the second visual indication. The at least one visual indication associated with each of the at least one relevant point of interest has a transparency of the visual indication dependent on the presence of the known physical barrier between the mobile device and the relevant point of interest, and wherein the relevant point of interest is disposed beyond the known physical barrier relative to the mobile device and the visual indication is transparent. The geographic area of interests comprises an indoor environment. The instructions to cause the computer to use the indication of the position of the mobile device, the indication of the direction associated with the mobile device, information regarding identities of points of interest within a geographic region of interest, and information regarding areas associated with the points of interest to determine the at least one relevant point of interest, of the points of interest, that is associated with the position and direction of the mobile device include instructions to cause the computer to: identify at least one eye ray associated with the position of the mobile device and the indication of direction of the mobile device; project the eye ray through a geometric representation of the indoor environment; and identify at least one point of interest with which the eye ray intersects as the at least one relevant point of interest. The instructions to cause the computer to display the at least one visual indication associated with each of the at least one relevant point of interest on the mobile device include instructions to cause the computer to: sort the at least one relevant point of interest based on a distance of each of the at least one relevant point of interest from the position of the mobile device; render at least one visual indication associated with each of the relevant points of interest; and display the at least one visual indication associated with each of the at least one relevant point of interest and a representation of a field of view of a camera of the mobile device. The at least one visual indication associated with each of the at least one relevant point of interest has at least one of a size or a transparency of the visual indication dependent on the distance from the mobile device of the relevant point of interest. The instructions to cause the computer to display the at least one visual indication associated with each of the at least one relevant point of interest on the mobile device include instructions to cause the computer to: sort the at least one relevant point of interest based on a distance of each of the at least one relevant point of interest from the position of the mobile device; determine an alpha channel value for each of the at least one relevant point of interest based on a distance of the at least one relevant point of interest from the position of the mobile device; generate composite image content based on a graphical indications associated with each of the at least one relevant point of interest and the alpha channel value associated with each of the at least one relevant point of interest; and display the composite image content on a display of the mobile device. The graphical indications associated with each of the at least one point of interest comprises an image of the relevant point of interest associated with the graphical indications.

An example apparatus for displaying navigation information on a mobile device according to the disclosure includes a transceiver configured to transmit and receive data wirelessly; a memory configured to store processor-executable program code; and a processor. The processor is configured to obtain, at the mobile device, an indication of a position of the mobile device; obtain, at the mobile device, an indication of a direction associated with the mobile device; use the indication of the position of the mobile device, the indication of the direction associated with the mobile device, information regarding identities of points of interest within a geographic region of interest, and information regarding areas associated with the points of interest to determine at least one relevant point of interest, of the points of interest, that is associated with the position and direction of the mobile device; and display at least one visual indication associated with each of the at least one relevant point of interest on the mobile device. An appearance of the at least one visual indication for each of the at least one relevant point of interest is dependent on at least one of a distance from the mobile device of the relevant point of interest associated with the visual indication or presence of a known physical barrier between the mobile device and that relevant point of interest associated with the visual indication.

Implementations of such an apparatus may include one or more of the following features. The at least one visual indication associated with each of the at least one relevant point of interest has at least one of a size or a transparency of the visual indication dependent on the distance from the mobile device of the relevant point of interest. The processor being configured to use the indication of the position of the mobile device, the indication of the direction associated with the mobile device, information regarding identities of points of interest within a geographic region of interest, and information regarding areas associated with the points of interest to determine at least one relevant point of interest, of the points of interest, that is associated with the position and direction of the mobile device is further configured to determine a first relevant point of interest at a first different distance from the mobile device and a second relevant point of interest at a second different distance from the mobile device that is greater than the first distance, and wherein the processor being configured to display at least one visual indication associated with each of the at least one relevant point of interest on the mobile device is further configured to display first and second visual indications corresponding to the first and second relevant points of interest, respectively, with the first visual indication being at least one of larger or less transparent than the second visual indication. The at least one visual indication associated with each of the at least one relevant point of interest has a transparency of the visual indication dependent on the presence of the known physical barrier between the mobile device and the relevant point of interest, and wherein the relevant point of interest is disposed beyond the known physical barrier relative to the mobile device and the visual indication is transparent. The geographic area of interests comprises an indoor environment. The processor being configure to use the indication of the position of the mobile device, the indication of the direction associated with the mobile device, information regarding identities of points of interest within a geographic region of interest, and information regarding areas associated with the points of interest to determine the at least one relevant point of interest, of the points of interest, that is associated with the position and direction of the mobile device is further configured to: identify at least one eye ray associated with the position of the mobile device and the indication of direction of the mobile device; project the eye ray through a geometric representation of the indoor environment; and identify at least one point of interest with which the eye ray intersects as the at least one relevant point of interest. The processor being configured to display at least one visual indication associated with each of the at least one relevant point of interest on the mobile device is further configured to: sort the at least one relevant point of interest based on a distance of each of the at least one relevant point of interest from the position of the mobile device; render at least one visual indication associated with each of the relevant points of interest; and display the at least one visual indication associated with each of the at least one relevant point of interest and a representation of a field of view of a camera of the mobile device. The at least one visual indication associated with each of the at least one relevant point of interest has at least one of a size or a transparency of the visual indication dependent on the distance from the mobile device of the relevant point of interest. The processor being configured to display the at least one visual indication associated with each of the at least one relevant point of interest on the mobile device is further configured to: sort the at least one relevant point of interest based on a distance of each of the at least one relevant point of interest from the position of the mobile device; determine an alpha channel value for each of the at least one relevant point of interest based on a distance of the at least one relevant point of interest from the position of the mobile device; generate composite image content based on a graphical indications associated with each of the at least one relevant point of interest and the alpha channel value associated with each of the at least one relevant point of interest; and display the composite image content on a display of the mobile device. The graphical indications associated with each of the at least one point of interest comprises an image of the relevant point of interest associated with the graphical indications.

Items and/or techniques described herein may provide one or more of the following capabilities, as well as other capabilities not mentioned.

BRIEF DESCRIPTIONS OF THE DRAWINGS

FIG. 7 is a block flow diagram of a process for determining a relevant set of points of interest.

FIG. 8 is a block flow diagram of a process for determining displaying on the display of the mobile device a directional view of relevant points of interest within a field of view of a camera of a mobile device.

Figure 10:
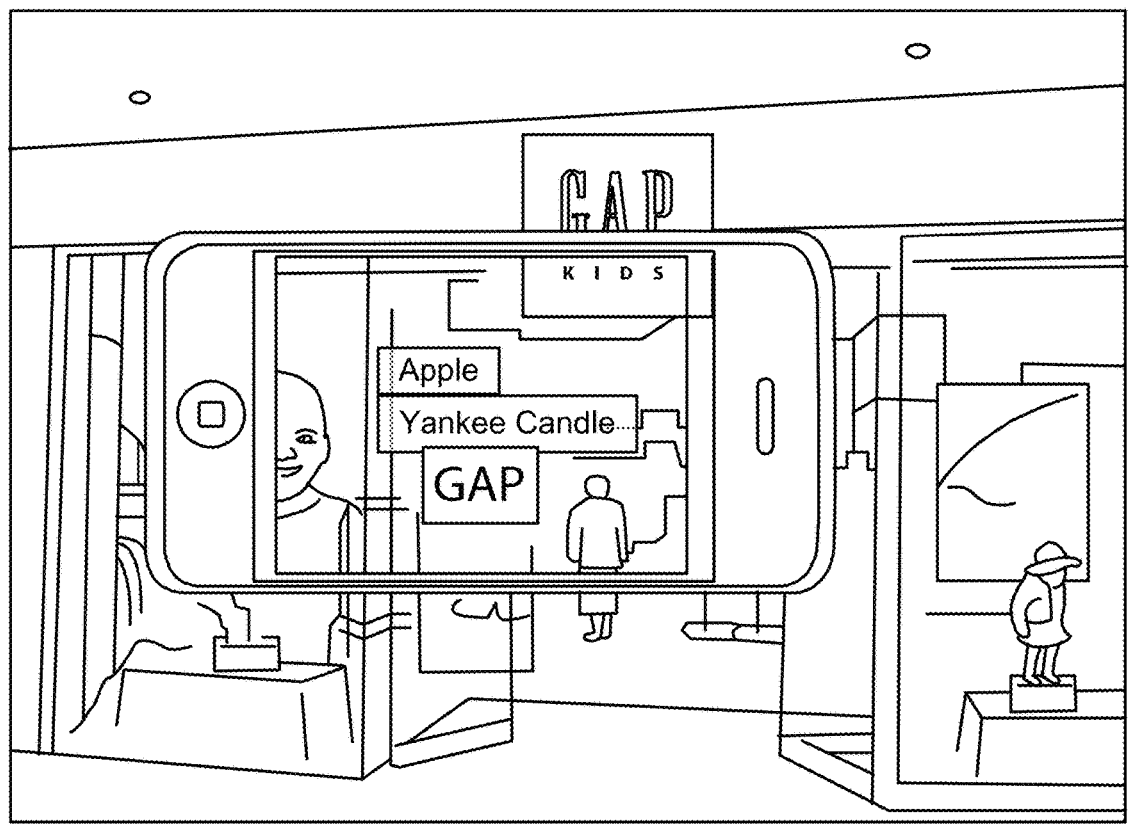

FIG. 10 provides an example of a mobile device displaying a directional view of POIs within the field of view of the camera of the mobile device.

Figure 11C:
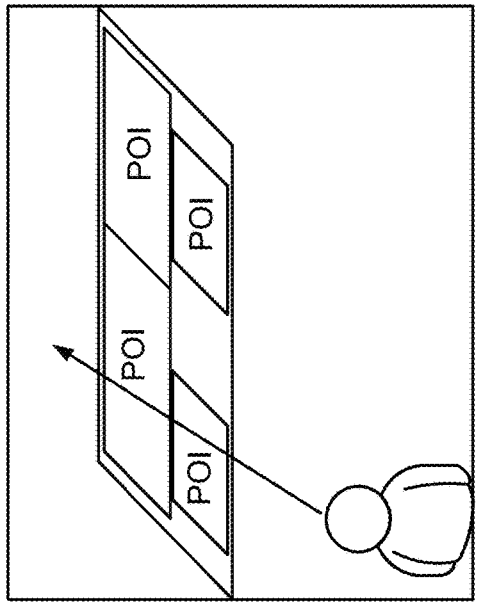
Figure 11A:
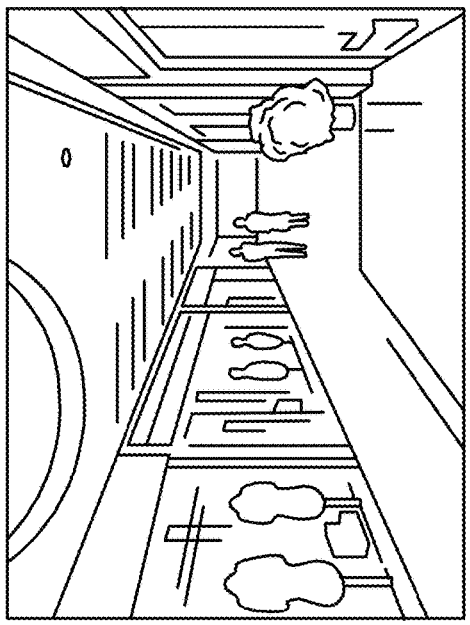
Figure 11B:
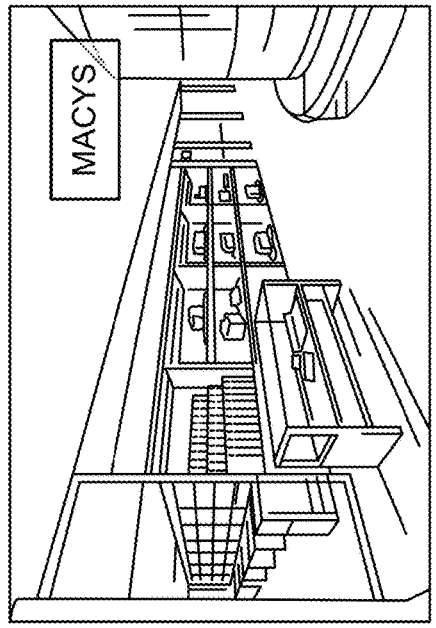
Figure 11D:
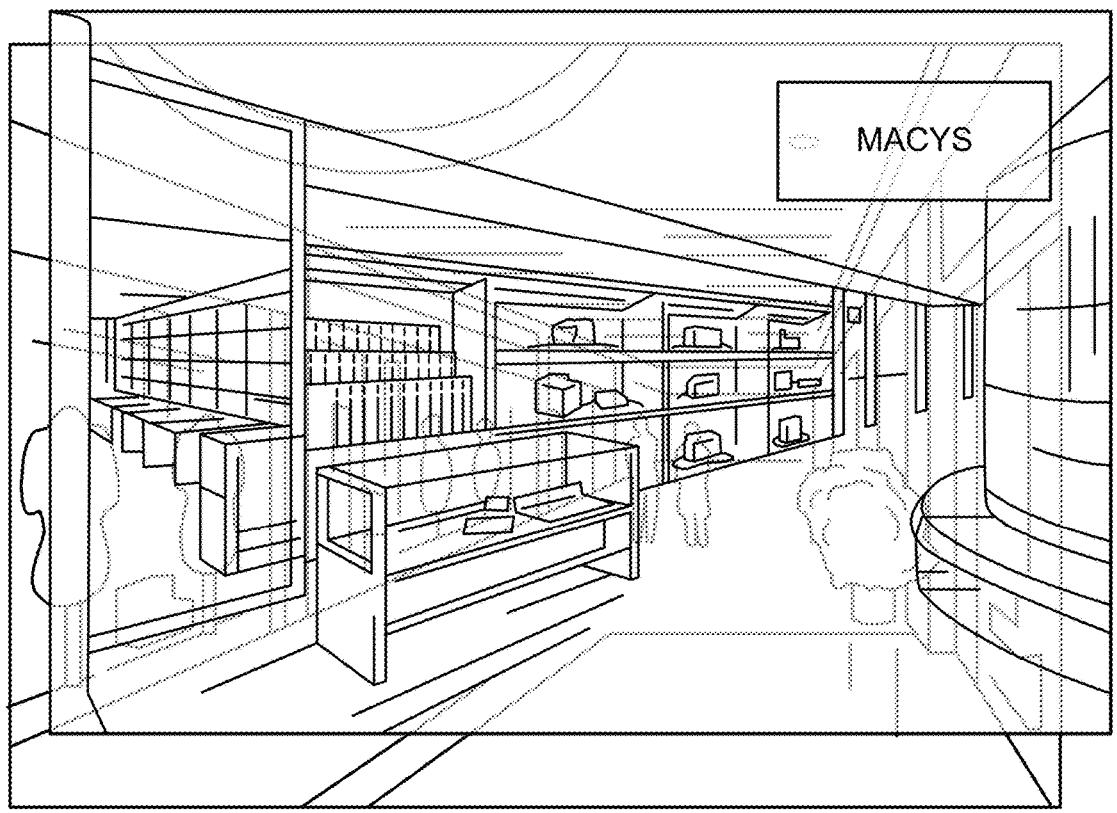

FIGS. 11A, 11B, 11C, and 11D provide an example of a how an X-ray review of a geographical area of interest can be created from an image of the area of geographical interest (FIG. 11A), an image associated with a POI (FIG. 11B), an illustration of an eye-ray being projected from the current position of the mobile device through a 2D model of the geographic area of interest (FIG. 11C), and an X-ray view generated based on the image of the geographical area of interest and the image associated with the POI (FIG. 11D).

DETAILED DESCRIPTION

Techniques are provided for assisting with navigation through an indoor environment and/or through a combination of indoor and outdoor environments using a mobile device. The indoor and/or combination of indoor and outdoor environment for which the navigation technique provided herein are generally referred to as a "geographical area of interest." The techniques provided can assist with navigation through a geographical area of interest comprising an indoor environment, such as an office building, shopping mall, a hotel, government offices, event venue, or other indoor environment. The techniques provided can also assist with navigation thorough a geographical area of interest comprising a combination of indoor and outdoor environments, such as a corporate campus or a university campus that are a combination of both indoor and outdoor spaces. The techniques provided could also be applied to other areas where a user may wish to navigate from an outdoor area to an indoor area or vice versa, such as downtown area or a shopping district where the user may wish to navigate from a street level into one or more buildings or vice versa and to be able to view POIs within the geographical area of interest.

The navigation techniques provided can present visual indications of points of interest (POIs) to a user of a mobile device. The POIs presented to the user can include POIs that are not visible to the user and/or to a camera of the mobile device. The visual indications of the POIs can include textual and/or graphical indications of the POIs. The visual indications of the POIs can be provided in the direction of the POIs from the mobile device and can include indications of how far the POIs are from the position of the mobile device. The visual indications can also indicate whether each POI is beyond a physical barrier (e.g., a wall, floor, or ceiling) of a building within the geographic area of interest. The visual indications can provide a sense of distances of the POIs from the position of the mobile device, e.g., with decreasing size of indications with increasing distance from the mobile device and/or increasing transparency of the indications with increasing distance from the mobile device.

In an example implementation, a mobile device, such as a mobile phone or tablet computer, can determine the position and orientation of the mobile device. Using the position and orientation, the mobile device can be configured determine a viewing direction or field of view (FOV) of a camera of the mobile device. The mobile device can compare the FOV with a two-dimensional (2D) or three-dimensional (3D) map that includes locations and areas corresponding to the POIs. The mobile device can provide visual indications on a display of the mobile device as to the POIs that are within the FOV of the camera of the mobile device based on the current position and orientation of the mobile device.

Figure 1:
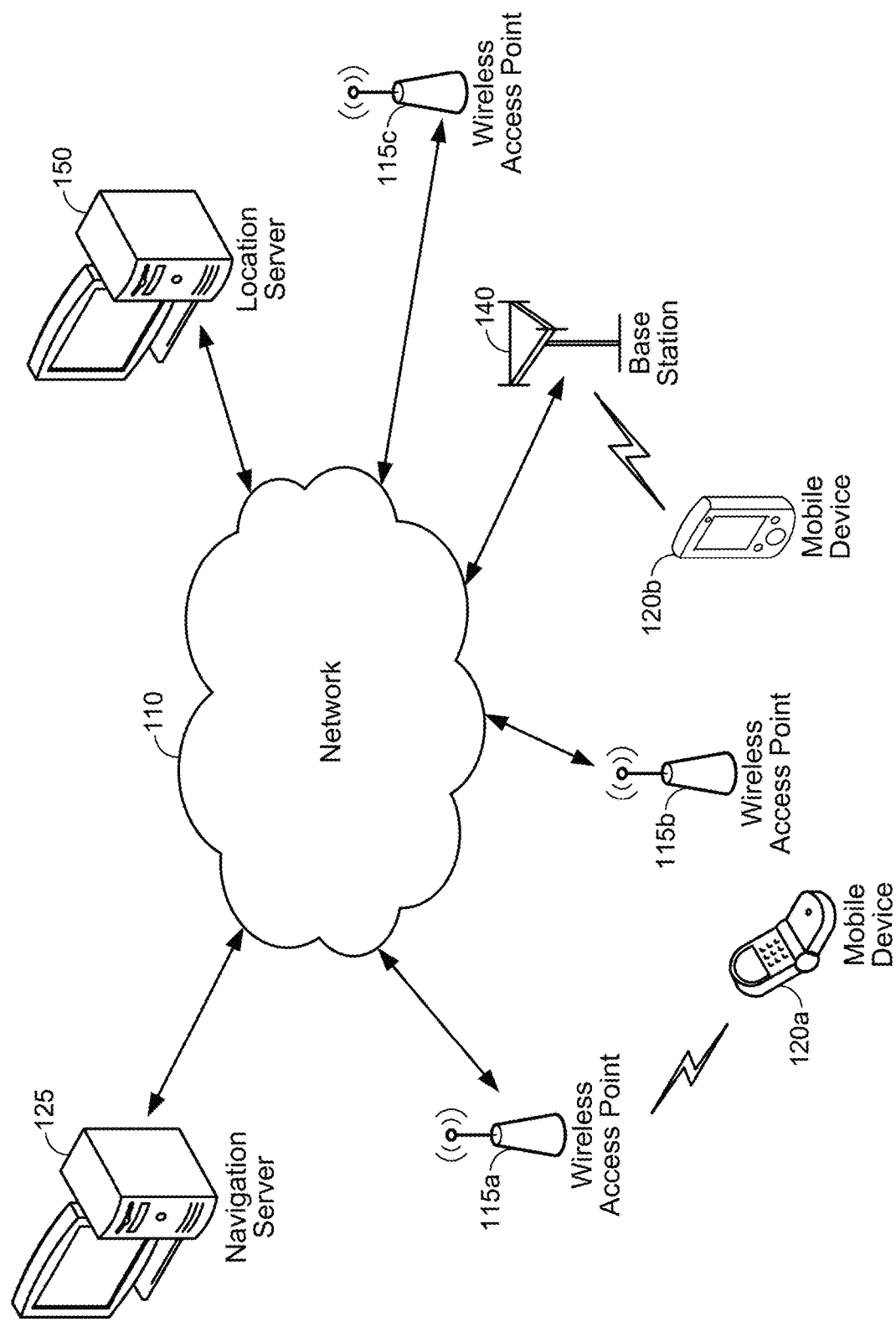
FIG. 1 is a simplified diagram of a wireless communication system.

FIG. 1 is a simplified diagram of an example wireless communication system in which the techniques for improved navigation of an indoor environment disclosed herein can be implemented. In the example illustrated in FIG. 1, the wireless network environment includes wireless access points 115 (where each instance of a wireless access point is labeled with a separate letter—e.g., 115a, 115b, and 115c), a base station 140, a plurality of mobile devices 120 (where each instance of which is labeled with a separate letter—e.g., 120a, 120b), a network 110, a navigation server 125, a location server 150.

The example network environment illustrated in FIG. 1 includes a three wireless access points 115a, 115b, and 115c, but other network environments that can be used to implement the techniques disclosed herein may include more wireless access points. Furthermore, the wireless access points may be distributed throughout an indoor environment and may be placed on different floors within the indoor environment. The term "access point" is used for simplicity, but refers to communication devices, more generally, one example of which include access points in wireless local area networks, such as IEEE 802 series compliant networks including the IEEE 802.11 family of standards commonly referred to as Wi-Fi. For example, devices that use Bluetooth can be communication devices according to the disclosure. As such, the usage of the term access point is not exclusive of other kinds of communication networks. Furthermore, a wireless access point 115 can be configured to implement other wireless communications standards in addition or instead of standards from the IEEE 802 series. The wireless access point 115 can also be implemented as a femtocell or picocell that is configured to operate a base station for a mobile communications network. A wireless access point 115 can either be located at a fixed location or may be mobile. For example, a wireless access point 115 can be a mobile device that is configured to provide a WiFi hotspot and is configured to wirelessly connect to a mobile communication network, e.g. a WAN to provide network connectivity to the WiFi hotspot.

The base station 140 can be configured to wirelessly communication with a plurality of mobile devices, such as mobile devices 120a and 120b. The base station 140 may be located within the indoor environment and/or may provide a coverage area that overlaps with at least a portion of the indoor environment. The base station 140 can be associated with a mobile communications network provider and can be configured to communication using one or more wireless communications protocols for mobile devices. For example, the base station 140 can be configured to use on more of the wireless communications protocols, such as Code Division Multiple Access (CDMA), Time Division Multiple Access (TDMA), Frequency Division Multiple Access (FDMA), Orthogonal FDMA (OFDMA), and Single-Carrier FDMA (SC-FDMA), Long Term Evolution (LTE), and/or other wireless communications protocols. For example, the base station 140 can be an evolved Node B (eNB) in a wireless communication system implanting the LTE wireless communications standards. The wireless communications discussed herein are only examples of some of the types of wireless protocols that may be implemented by the base station 140, and are not intended to limit the techniques discussed herein to wireless communication networks using these protocols. The network environment illustrated in FIG. 1 only illustrates a single base station 140, but an indoor environment such as those where the techniques disclosed herein may be implemented may be within the coverage area of multiple base stations 140.

The example network environment illustrated in FIG. 1 also includes two mobile devices 120a and 120b, but other network environments that can be used to implement the techniques disclosed herein may include either more or less mobile devices. The mobile devices 120a and 120b can be configured to communicate with one or more servers, such as navigation server 125 and/or location server 150. The mobile devices 120a and 120b can be configured to communicate with the servers through one of the wireless access points 115 or the wireless base station 140.

The navigation server 125 can be configured to store electronic content, such as applications, that can be provided to one or more mobile devices 120 and can be executed by the mobile devices 120. In other implementations, the network environment may contain other servers (not shown) that can also be configured to provide information and/or electronic content to the mobile devices 120a and 120b. The navigation server 125 can be configured to provide 2D and/or 3D map information for indoor environments to the mobile devices 120. The navigation server 125 may be implemented by an owner or manager of an indoor environment or may be implemented by a third party, such as a wireless network service provider. An example implementation of a navigation server that can be used to implement the navigation server 125 is provided in FIG. 4.

The location server 150 can be configured to provide location based services, such as determining the position of the mobile device 120 and/or providing assistance data that the mobile devices 120 can use to determine the position of the mobile devices 120. An example implementation of a navigation server that can be used to implement the navigation server 125 is provided in FIG. 5. In some implementations, the navigation server 125 and the location server 150 can be implemented on the same server.

Figure 2:
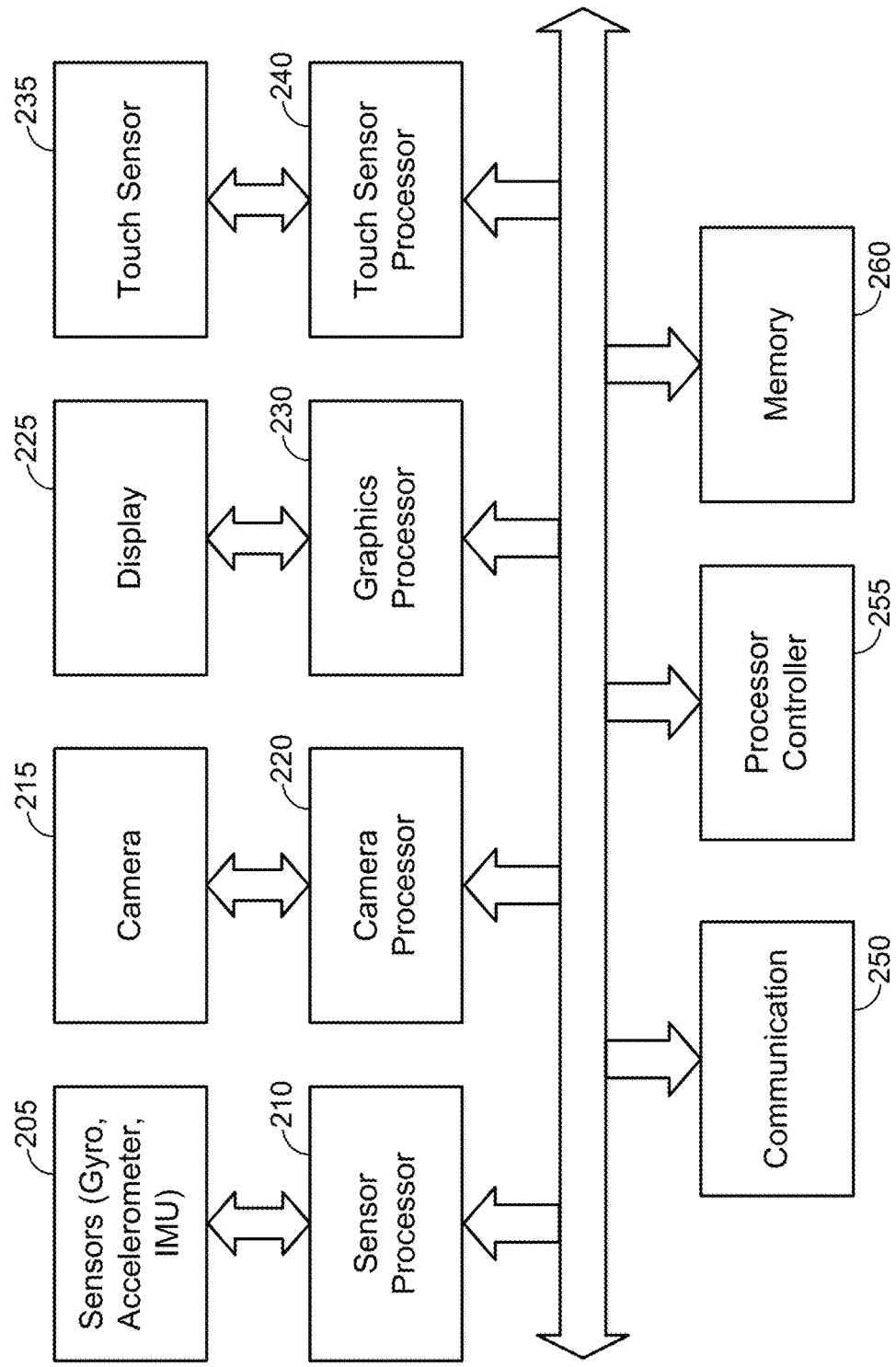
FIG. 2 is a functional block diagram of a mobile device that can be used to implement the mobile devices illustrated in FIG. 1.

FIG. 2 is an example of a system architecture that can be used to implement a mobile device, such as the mobile devices 120a and 120b illustrated in FIG. 1. A mobile device 120 may include some or all of the components illustrated in FIG. 2 and may include additional components illustrated in FIG. 3 and can be configured to implement various functions, such as the processes illustrated in FIGS. 6-9 described in detail below.

The mobile device 120 can include sensors 205 (e.g., gyros, accelerometers, an inertial measurement unit (IMU) and/or other types of sensors) and a sensor processor 210 for processing data collected by the sensors 205. Data collected by the sensors or the camera may be used to determine an orientation of the mobile device, acceleration or velocity of the mobile device, and/or other information that may be useful in determining the location of the mobile device 120. The data collected by the sensor 205 can also be used to provide inputs to one or more applications on the mobile device 120. The mobile device 120 can be configured to use the data collected by the sensors 205 to determine how the mobile device 120 is oriented and can use that information in addition to the estimated position of the mobile device within an indoor environment to determine a field of view associated with the mobile device within the indoor environment and to display that field of view on the mobile device 120. The field of view into the indoor environment can provide the user with an augmented view of the indoor environment in which they are located that can assist the user in navigating through the indoor environment.

The mobile device 120 can also include a camera 215 and a camera processor 220. The camera 215 can be configured to capture images and/or video content. The camera processor 220 can be configured to process the data collected by the camera 215 and to convert the data collected by the camera into a format that can be used by one or more applications on the mobile device 120 and/or viewed on the display 225 of the mobile device 120. The camera processor 220 can be configured to perform various types of image or video processing on the data collected from the camera to prepare the content for display on display 225. For example, the camera of the mobile device 120 can be configured to capture images and/or video within the field of view of the camera 215 of the mobile device 120. The mobile device 120 can be configured to use the captured images and/or video to provide an augmented view of the indoor environment to the user of the mobile device that can include point of interest (POI) information. For example, the mobile device 120 can be configured to provide a directional view that can include textual and/or graphical indications identifying the position of POIs relative to the position of the mobile device 120 and/or an X-ray view where POI information for POIs that may otherwise be occluded from view by components of the indoor environment, such as doors, walls, ceilings, and floors, can be displayed to the user. Camera processor 220 may also be used to determine how the mobile device 120 is oriented.

The display 225 can be a touch screen interface that includes touch sensor 235. The graphics processor 230 can be used to generate graphical data for display on display 225. Applications on the mobiles station 12 and/or other executable programs, such as the operating system and the positioning engine, can be implemented in software and/or hardware and can be configured to send commands to the graphics processor 230 to display image or video content on the display 225. The touch sensor processor 240 can process data output by the touch sensor 235 to identify when a user touches the touch screen. The touch sensor processor 240 can be configured to identify various touch gestures, including multi-finger touches of the touch screen. The operating system, applications, and/or the positioning engine can use the gesture information determined by the touch sensor processor 240 to determine, at least in part, receive and respond to user input. The display 225 of the mobile device 120 can be a 2D display or can be a 3D display capable of displaying stereoscopic images. The mobile device 120 can be configured to render 2D and/or 3D content depending upon the capabilities of the display 225 and the configuration of the mobile device 120.

The communications controller 250 can be configured to enable the device to communicate using one or more wireless protocols and to enable the mobile device to communicate with one more devices via the network 110. The communications controller 250 can be configured to allow the device to send and receive data from nearby wireless devices, including wireless access point and other mobile devices 120. For example, the communications controller 250 can be configured to enable the mobile device 120 to communicate either directly or indirectly with the wireless access points 115, the base station 140, the navigation server 125, the location server 150, and other mobile devices 120. The communications controller 250 can also be configured to enable the mobile device 120 to receive navigation signals that the mobile device 120 can use to determine its location. For example, the communications controller 250 can be configured to receive signals from satellite vehicles (SVs) belonging to one or more Satellite Positioning Systems (SPSs), such as the GPS system, the GLONASS system, the Galileo system, and/or other SPSs.

The memory 260 includes volatile and/or persistent memory for storing data used by various components of the mobile device 120. The memory 260 can be used to store processor-executable program code for one or more of the processors included in the device. The processor controller 255 can be configured to control one or more of the sensor processor 210, camera processor 220, the graphics processor 230, and the touch sensor processor 240. One or more of the sensor processor 210, camera processor 220, the graphics processor 230, and the touch sensor processor 240 may also be implemented by the processor controller 255. The processor controller 255 can also be configured to execute processor-executable program code.

Figure 3:
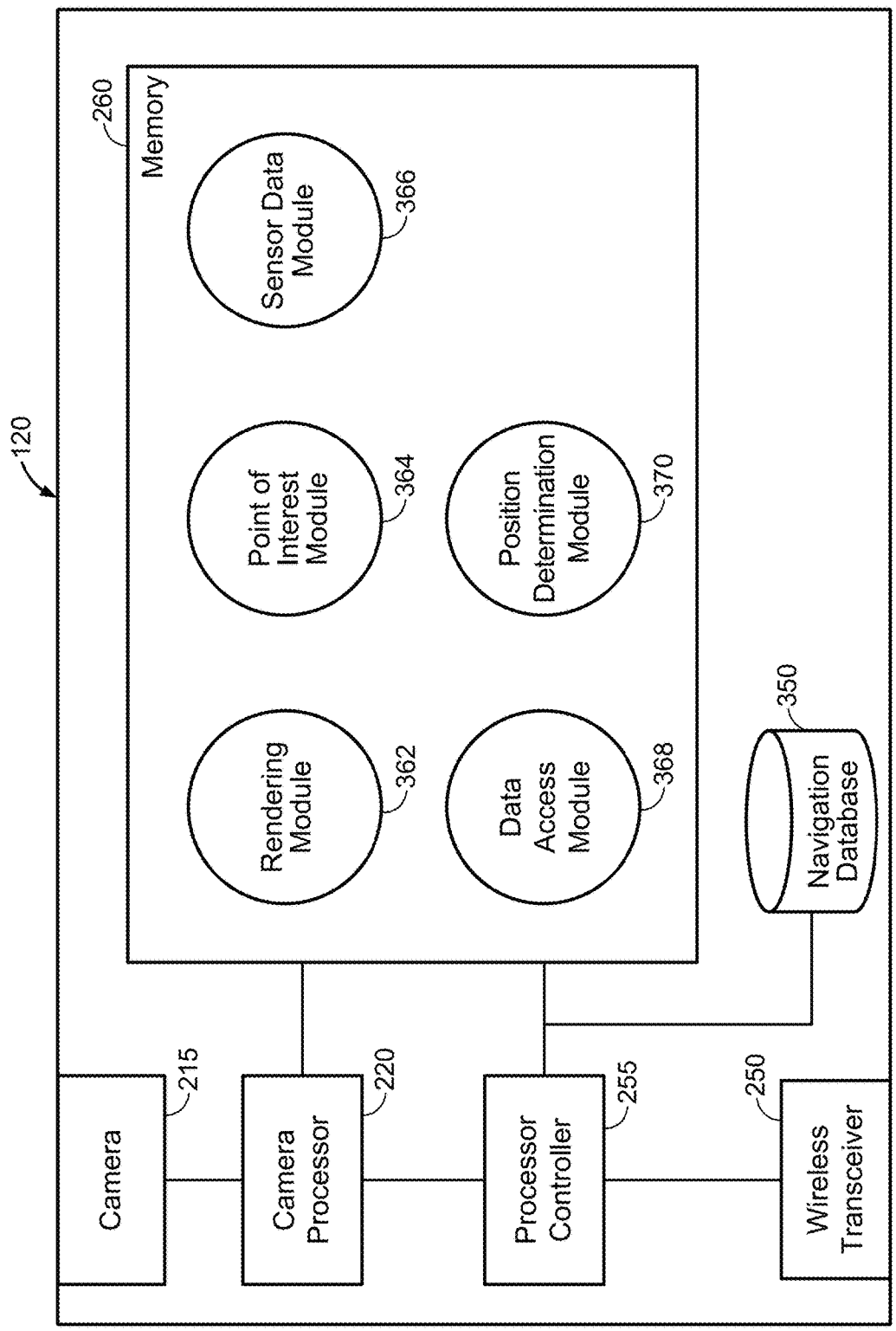
FIG. 3 is a functional block diagram of the mobile device illustrated in FIG. 1 that illustrates functional modules of a memory shown in FIG. 2.

FIG. 3 is a functional block diagram of the mobile device illustrated in FIG. 1 that illustrates functional modules of a memory shown in FIG. 2. For example, the mobile device 120 can include a rendering module 362, a point of interest module 364, an orientation determination module 366, a data access module 368, and a position determination module 370. The mobile device 120 can also include a navigation database 350.

The rendering module 362 can be configured to render an augmented view of an indoor environment that can improve navigation through a geographic area of interest. The rendering module 362 can configured to render a view of an indoor and/or outdoor environment that overlays and/or blends augmented content with images and/or video captured by the camera 215 of the mobile device 120. The rendering module 362 can be configured to display a representation of the "field of view" of the camera 215 of the mobile device 120 on the display 225 of the mobile device 120. The camera can be configured to capture a series of still images or video of a portion the geographic area of interest within the field of view of the camera 215 and the rendering module 362 can be configured to receive the series of still images and/or video captured by the camera and to augment the received content with navigational aids. The navigational aids can provide visual indications of the locations of points of interest (POIs) relative to the position of the mobile device 120 within the indoor environment. The rendering module 362 can be configured to provide a directional view of the geographical area of interest and an X-ray view of the geographical area of interest that can provide navigational clues to a user of the mobile device 120 that can assist the user of the mobile device 120 in navigating the indoor and/or environments comprising the geographic area of interest. The mobile device 120 can be configured to display the directional view and/or the X-ray view.

The rendering module 362 can be configured to obtain the current position of the mobile device 120 from the position determination module 370 and/or the location server 150 and the orientation of the mobile device 120 from the orientation determination module 366. The rendering module 362 can be configured to provide the position and orientation of the mobile device to the point of interest (POI) module 364 to obtain POI information for points of interest within the field of view of the mobile device 120. The POI information can be sorted by relative distance of each of the POIs from the current position of the mobile device 120 and can include a graphical and/or textual indications associated with each of the POIs.

When the mobile device 120 is configured to operate in the directional view, the rendering module 362 can be configured to provide an augmented view of the geographic area of interest that includes overlays of textual and/or graphical indications illustrating the relative position of POIs within the geographic area of interest. Once the rendering module 362 has obtained the POIs from the POI module 364, the rendering module 362 can be configured to generate the augmented view of the geographic area of interest by overlaying the graphical and/or textual indications associated with each POI within the field of view of the camera onto the series of images and/or video content captured by the camera 215 of the mobile device 120. For example, when used in an indoor shopping mall, the directional view of an indoor environment could be used to display POIs typically found in a shopping mall, such as restrooms, fitting rooms, store locations, and mall exits. FIG. 10 provides an example of a mobile device 120 displaying a directional view of POIs within the field of view of the camera 215 of the mobile device 120.

The rendering module 362 can be configured to include the textual and/or graphical indications associated with each of the POIs in the field view in the augmented view of the indoor environment generated by the rendering module 362. The rendering module 362 can be configured to place the textual and/or graphical indications associated with each of the POIs within the augmented view of the indoor environment based on their position of each of the POIs relative to the current position of the mobile device 120. The rendering module 362 can be configured to render the textual and/or graphical indications associated with POI to indicate the relative distance of the POI from the current position of the mobile device 120. For example, the rendering module 362 can be configured render the textual and/or graphical indications associated with POIs that are closer to current position of the mobile device 120 such that the textual and/or graphical indications are larger than the textual and/or graphical indications associated with POIs that are farther from the current position of the mobile device 120. The rendering module 362 can also be configured to use other methods to indicate the distance of the POIs from the current position of the mobile device, such as color coding the textual and/or graphical indications, rendering the textual and/or graphical indications using different levels of transparency based on the distance of the POIs from the current position of mobile device, or using different textures when rendering the textual and/or graphical indications to represent different distances from the current position of the mobile device 120. For example, the textual and/or graphical indications associated with POIs that are closer to the current position of the mobile device 120 can be rendered as opaque while the textual and/or graphical indications associated with POIs that are farther from the mobile device 120 can be rendered as increasingly transparent based on their distance from the current position of the mobile device 120.

When the mobile device 120 is configured to operate in the X-ray view, the rendering module 362 can be configured to provide an augmented view of the indoor environment that can illustrate details of POIs that would otherwise be blocked by objects in the field of view of the mobile device 120, including components of the indoor environment and/or other POIs. When rendering the X-ray view, the rendering module 362 can be configured to first obtain a set of POIs from the POI module 364 as described above. Each POI can include one or more images associated with the POI, and the rendering module 362 can be configured to render a composite image of the indoor environment based on the series of images and/or video captured by the mobile device 120 and the images associated with the POIs that fall within the field of view of the mobile device 120. The rendering module 362 can be configured to request that the POIs retrieved by the POI module 364 be ordered based on the distance between each of the POIs and the current position of the mobile device 120. The rendering module 362 can then generate an augmented view where an image associated with the POI is rendered as semi-transparent based on the distance of the POI from the current position of the mobile device 120. In one implementation, the rendering module 362 can be configured to use alpha compositing to generate the augmented view where the image associated with each of the POIs is associated with an alpha channel value that falls within a range of completely opaque to completely transparent. The rendering module 362 can be configured to assign an alpha channel value representing a higher transparency to those POIs farther from the current position of the mobile device 120 and an alpha channel value representing a lower transparency to those POIs closer to the current position of the mobile device 120. The rendering module 362 can then be configured to render a composite image of the field of view of the mobile device 120 by compositing the field of view content captured by the camera 225 with the POI images, starting with those POIs farther from the current position of the mobile device 120. The resulting composite image provides X-ray view of the indoor environment that can allow the user to see through walls of the indoor environment to see details that the user would not otherwise be able to see from their vantage point.

FIGS. 11A, 11B, 11C, and 11D provide an example of a how an X-ray review of a geographical area of interest can be created from an image of the area of geographical interest. The image illustrated in FIG. 11A is an image of a geographical area of interest captured by the camera 215 of the mobile device 120. In this example, the geographical area of interest is a shopping mall, and the image illustrated in FIG. 11A is of a corridor of the shopping mall. FIG. 11B is an image associated with that a POI. In this example, the POI is an image of the interior of a department store within the shopping mall. FIG. 11C is a figure illustrating projecting an eye ray from the current position of the mobile device 120 through a 2D map of the geographic area of interest. The 2D map in this example is a 2D map of the shopping mall. The eye ray projection technique is illustrated in FIG. 7 and is discussed in greater detail below. The process illustrated in FIG. 7 can also be used to identify POIs relevant POIs that can be displayed using the directional view. FIG. 11D provides an example of an X-ray view of a POI. In this example, the view of the corridor representing the field of view of the camera 215 of the mobile device 120 that is illustrated in FIG. 11A has been rendered as transparent. The relevant POIs can then be overlaid over the image of the field of view of the camera 215 and rendered as partially transparent. In the example illustrated in FIG. 11D, only one POI has been included. However, if multiple relevant POIs were identified within the field of view of the camera 215, the POIs could be sorted based on their distance from the current position of the mobile device 120, and the textual and/or graphical indications associated with those POIs can then be rendered from farthest away to closest to the current position of the mobile device 120. A decreasing transparency level (alpha channel value) can be applied to the POIs that are closer to the current position of the mobile device 120. The X-ray view illustrated in FIG. 11D provides the user of the mobile device 120 with a view through the walls of the corridor to see a representation of the department store that is behind the walls of the corridor.

The rendering module 362 can be configured to request and receive updates to the position of the mobile device 120 from the position determination module 370 and/or the location server 150. For example, the rendering module 362 can be configured to automatically receive updates from the position determination module 370 and/or the location server 150 when the position of the mobile device 120 changes. The rendering module 362 can also be configured to receive updates from the orientation determination module 366 when the orientation of the mobile device changes 120. The rendering module 362 can be configured to automatically update the augmented view (directional view, X-ray view, or other augmented view) generated for display on the display 225 of the mobile device 120 in response to changes to the position and/or the orientation of the mobile device 120.

The point of interest (POI) module 364 can be configured to identify points of interest within the field of view of the mobile device 120. The rendering module 362 can be configured to obtain the current position of the mobile device 120 within the geographical area of interest from the position determination module 370 and/or from the location server 150 and to provide the location of the mobile device 120 to the point of interest module 364. The rendering module 362 can also be configured to obtain orientation information for the mobile device 120 from the orientation determination module 366. The POI module 364 can be configured use the position and orientation information to identify a set of one or more POIs that are in the direction of the field of view of the mobile device 120. The POIs may or may not be visible from the current position of the mobile device 120. The POIs may be behind other objects in the field of view of the camera. For example, the POIs may be behind physical barriers, such as components of the geographical area of interest, including walls, doors, floors, ceilings, or other components of the geographical area of interest. The POI module 364 can be configured to order the set of POIs by their relative distance from the current position of the mobile device 120 and can be configured to mark each POI to indicate whether the POI may be visible from the current position of the mobile device or whether the POI is obscured behind another component of the geographical area of interest.

The POI module 364 can be configured to access POI data from the navigation database 350 via the data access module 368. The data access module 368 can be configured to access the POI information for the geographical area of interest, and to provide the POI data to the POI module 364. For example, the data access module 368 can be configured to access the POI information for a particular indoor environment or portion of an indoor environment associated with the geographic area of interest, such as a floor of the indoor environment.

The navigation database 350 can include POI information associated with POIs. For example, the POI information associated with the POI can include geometry information defining the boundaries of the POI. For example, the POI information can include a set of one or more polygons defining the boundaries of the POI. The POI information can also include coordinates associated with the POI. The coordinates can be expressed in geographic coordinates (e.g., latitude and longitude) or expressed in a self-defined coordinate system where the coordinates of each of the POIs for the geographic area of interest is normalized to a bounding area. The information associated with the POI can also include images of the POIs that can be used to represent the POI in the X-ray view of the geographic area of interest and can include textual and/or graphical labels that can be used to represent the POI in the directional view of the geographic area of interest provided by the rendering engine 362.

The POI module 364 can be configured to identify which POIs are relevant using a process similar to that illustrated in FIG. 7. The POI module 364 can be configured to project an "eye ray" through a 2D or 3D geometric representation of the geographic area of interest. The eye ray can be projected through the geometric representation of the geographic area of interest and those POIs which with the eye ray intersect can be selected as relevant POIs. The relevant POIs may not directly be within the line of sight of the camera 215 of the mobile device 120 and may be separated from the position of the mobile device 120 by one more physical barriers, including components of the geographic area of interest, such as walls, floors, ceiling, doors, etc. or by one more objects within the geographic area of interest.

The orientation determination module 366 can be configured to receive information collected by the sensors 205. The data collected by the sensors 205 can be received and processed by the sensor processor 210 and/or may be transferred to the orientation determination module 366 by the sensor processor 210 as the sensor data is received from the sensors 205. The orientation determination module 366 can be configured to provide sensor data to the rendering module 362, the position determination module 370, the field of view module 372, and/or other modules or applications on the mobile device 120. For example, the orientation determination module 366 can be configured to determine an orientation of the mobile device 120 based on information collected by the sensors 205 and/or the camera 215, and the orientation determination module 366 can provide the orientation to the rendering module 362 and/or the field of view module 372. In some implementations, the orientation determination module 366 can be configured to determine the orientation of the mobile device based on image content captured by the camera 215 of the mobile device 120. The orientation determination module 366 can be configured to use various techniques, such as the determining a vanishing point for an image captured by the camera 215 of the mobile device 120 to determine the orientation of the mobile device 120.

The field of view module 372 can be configured to use the orientation information to determine a field of view of the mobile device 120, and the field of view module 372 can provide the field of view information to the point of interest module 364 which can be configured to use the field of view information to determine which POIs are included in the field of view of the mobile device 120. The rendering module 362 can be configured to use the field of view information 372 to determine which portion of the indoor environment should be rendered on the display 225 of the mobile device 120.

The data access module 368 can be configured to access data stored in the memory 460 of the mobile device 120 and/or in the navigation database 350. The data access module 368 can be configured to access data stored in or to store data in the memory 260 and/or in the navigation database 350 in response to requests from the rendering module 362, the orientation determination module 366, the field of view module 372, and/or other applications or modules implemented on the mobile device 120.

The position determination module 370 can be configured to determine the position of the mobile device 120 within an indoor environment and/or in an outdoor environment. In an indoor environment, the position determination module 370 can be configured to obtain measurements of signals from a plurality of wireless access points 115 to estimate the location of the mobile device 120 within an indoor environment in various ways. The position determination module 370 can be configured to determine the position of the mobile device 120 using signals from wireless access points 115 to determine the position of the mobile device 120 within an indoor environment. For example, the position determination module 370 can be configured to perform trilateration using signal measurements (e.g., RSSI (received signal strength indication), RTT (round-trip time)), time of arrival (TOA), and/or disambiguate between multiple possible disambiguation regions (e.g., floors) within an indoor environment, e.g., using RSSI and/or RTT measurements and known locations of the wireless access points 115 and/or wireless base stations 140. The position determination module 370 can also be configured to determine the position of the mobile device 120 using signals received from a Satellite Positioning System receiver associated with the mobile device 120 (e.g., associated with communications controller 250) to determine the position of the mobile device 120 when outdoors and a line of site to a sufficient number of satellites from one or more SPS constellations.

The position determination module 370 can also be configured to provide information to the location server 150 that the location server 150 can use to determine the location of the mobile device 120 and/or that the location server 150 can use to provide assistance data to the mobile device 120 such that the mobile device 120 determine the location of the mobile device 120. For example, location server 150 can send assistance data to the mobile device 120 that the mobile device 120 can use to acquire signals from satellites from one or more SPS constellations. The location server 150 can also be configured to provide the position determination module 370 of the mobile device 120 with an almanac of wireless access points 115 and/or base stations 140 which may be proximate to the mobile device 120. The position determination module 370 can use this information to identify wireless access points 115 and/or base stations 140 that may be proximate to the mobile device 120 and to use signals from nearby wireless access points 115 and/or base stations 140 to determine the position of the mobile device 120.

The position determination module 370 can be configured to provide the position of the mobile device 120 within an indoor environment to the rendering module 362, which can use the position information and the field of view information obtained from the field of view module 372 to determine what to render in the augmented view of the indoor environment presented on the display 225 of the mobile device 120.

Figure 4:
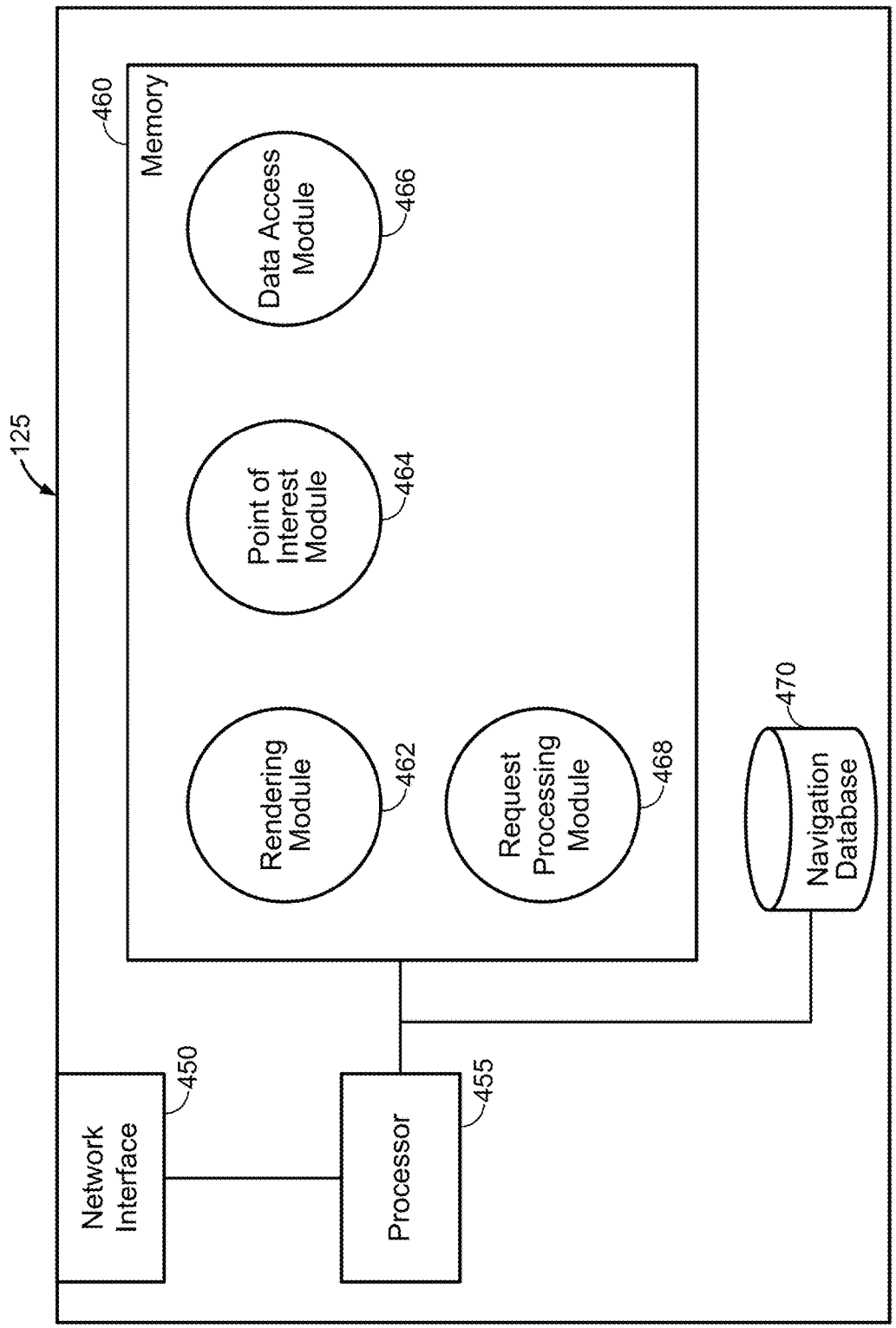
FIG. 4 is a functional block diagram of a computer system that can be used to implement the navigation server illustrated in FIG. 1.

FIG. 4 is a functional block diagram of a computer system that can be used to implement the navigation server 125 illustrated in FIG. 1. The navigation server 125 can include a processor 455, a network interface 450, a memory 460, and a navigation database 450. The navigation server 125 can also include functional modules that can be implemented as processor executable software code stored in memory 460. The functional modules illustrated in FIG. 4 can alternatively be stored either in part or in whole in a different computer-readable memory. For example, the functional modules may be stored in a removable computer-readable medium associated with the navigation server 125 120, such as a flash memory, a SD-Card, or other type of removable memory. The functional modules illustrated in FIG. 4 can also be implemented in part or in whole in firmware and/or hardware. The navigation server 125 can include a rendering module 462, a point of interest module 464, and a data access module 466.

The processor 455 can be configured to execute software code stored in the memory 460. For example, the processor 455 can be configured to execute the software code associated with the rendering module 462, the point of interest module 464, and the data access module 466. The processor 455 can also be configured to execute other software code used by the navigation server 125, such as operating system components, software drivers for peripheral devices, and/or other software code that may be executed by the navigation server 125 but the description of which is not required to understand the operation of the systems and methods disclosed herein.

The network interface 450 can be configured to provide bidirectional wireless and/or wired network communications to the navigation server 125. The network interface 450 can be configured to allow the navigation server 125 to communicate with mobile devices 120 via one or more intermediate networks, such as the Internet, a wireless network service provider's core network, one or more wireless local area networks (WLANs), and/or other types of network. The network communications between the network interface 450 of the navigation server 125 and the mobile devices 120 may be routed through one or more other network elements, such as wireless access point 115 or base station 140.

The memory 460 can comprise volatile and/or persistent memory for storing data used by various components of the navigation server 125. The memory 460 can be used to store processor-executable program code for one or more of the processors included in the navigation server 125, such as processor 455.

The rendering module 462 can be configured to operate similarly to the rendering module 362 of the mobile device 120. The rendering module 462 can be configured to render an augmented view of an indoor environment that can improve navigation through the indoor environment. In some implementations, the navigation server 125 can be configured to render and provide the augmented navigation content to the mobile device 120 rather than the augmented navigation content being generated on the mobile device 120. The augmented navigation content may be performed on the navigation server 125 rather than the mobile device 120 for various reasons. For example, the augmented navigation content may be generated on the navigation server 125 the mobile device 120 may not have sufficient resources to render the augmented navigation content or the augmented navigation content may be rendered by the navigation server 125 to conserve limited processing power, memory, and/or battery life on the mobile device 120.

The rendering module 462 can be configured to render a view of the indoor environment that overlays and/or blends augmented content with images and/or video captured by the camera 215 of the mobile device 120. The rendering module 462 can be configured to render a representation of the "field of view" of the camera 215 of the mobile device on the display 225 of the mobile device. The camera can be configured to capture a series of still images or video of a portion the indoor environment within the field of view of the camera 215 and the rendering module 462 can be configured to receive the series of still images and/or video captured by the camera and to augment the received content with navigational aids. The navigational aids can provide visual indications of the locations of points of interest (POIs) relative to the position of the mobile device 120 within the indoor environment. The rendering module 462 can be configured to provide a directional view of the indoor environment and an X-ray view of the indoor environment that can provide navigational clues to a user of the mobile device 120 that can assist the user of the mobile device in navigating the indoor environment.

The rendering module 462 can be configured to obtain the current position of the mobile device 120 from the position determination module 370 and/or the location server 150 and the orientation of the mobile device 120 from the orientation determination module 366. The rendering module c can be configured to provide the position and orientation of the mobile device to the point of interest (POI) module 364 to obtain POI information for points of interest within the field of view of the mobile device 120. The POI information can be sorted by relative distance of each POI from the current position of the mobile device 120 and can include a graphical and/or textual indications associated with each POI.

When the mobile device 120 is configured to operate in the directional view, the rendering module 462 can be configured to provide an augmented view of the indoor environment that includes overlays of textual and/or graphical indications illustrating the relative position of POIs within the indoor environment. Once the rendering module 362 has obtained the POIs from the POI module 464, the rendering module 462 can be configured to generate the augmented view of the indoor environment by overlaying the graphical and/or textual indications associated with each POI within the field of view of the camera onto the services of images and/or video content captured by the camera 215 of the mobile device 120. For example, when used in an indoor shopping mall, the directional view of an indoor environment could be used to display POIs typically found in a shopping mall, such as restrooms, fitting rooms, store locations, and mall exits. FIG. 10, as described above, provides an example of a directional view of a geographical area of interest, which in this example is a shopping mall.

The rendering module 462 can be configured to include the textual and/or graphical indications associated with each of the POIs in the field view in the augmented view of the indoor environment generated by the rendering module 462. The rendering module 462 can be configured to place the textual and/or graphical indications associated with each of the POIs within the augmented view of the indoor environment based on their position of each of the POIs relative to the current position of the mobile device 120. The rendering module 462 can be configured to render the textual and/or graphical indications associated with POI to indicate the relative distance of the POI from the current position of the mobile device 120. For example, the rendering module 462 can be configured render the textual and/or graphical indications associated with POIs that are closer to current position of the mobile device such that the textual and/or graphical indications are larger than the textual and/or graphical indications associated with POIs that are farther from the current position of the mobile device 120. The rendering module 362 can also be configured to use other methods to indicate the distance of the POIs from the current position of the mobile device, such as color coding the textual and/or graphical indications, rendering the textual and/or graphical indications using different levels of transparency based on the distance of the POIs from the current position of mobile device, or using different textures when rendering the textual and/or graphical indications to represent different distances from the current position of the mobile device 120. For example, the textual and/or graphical indications associated with POIs that are closer to the current position of the mobile device 120 can be rendered as opaque while the textual and/or graphical indications associated with POIs that are farther from the mobile device 120 can be rendered as increasingly transparent based on their distance from the current position of the mobile device 120.

When the mobile device 120 is configured to operate in the X-ray view, the rendering module 462 can be configured to provide an augmented view of the indoor environment that can illustrate details of POIs that would otherwise be blocked by objects in the field of view of the mobile device 120, including components of the indoor environment and/or other POIs. When rendering the X-ray view, the rendering module 462 can be configured to first obtain a set of POIs from the POI module 464 as described above. Each POI can include one or more images associated with the POI, and the rendering module 462 can be configured to render a composite image of the indoor environment based on the series of images and/or video captured by the mobile device 120 and the images associated with the POIs that fall within the field of view of the mobile device 120. The rendering module 462 can be configured to request that the POIs retrieved by the POI module 464 be ordered based on the distance between each POI and the current position of the mobile device 120. The rendering module 462 can then generate an augmented view where an image associated with the POI is rendered as semi-transparent based on the distance of the POI from the current position of the mobile device 120. In one implementation, the rendering module 462 can be configured to use alpha compositing to generate the augmented view where the image associated with each POI is associated with an alpha channel value that falls within a range of completely opaque to completely transparent. The rendering module 462 can be configured to assign an alpha channel value representing a higher transparency to those POIs farther from the current position of the mobile device and an alpha channel value representing a lower transparency to those POIs closer to the current position of the mobile device 120. The rendering module 462 can then be configured to render a composite image of the field of view of the mobile device 120 by compositing the field of view content captured by the camera 215 of the mobile device 215 with the POI images, starting with those POIs farther from the current position of the mobile device 120. The resulting composite image provides X-ray view of the indoor environment that can allow the user to see through walls of the indoor environment to see details that the user would not otherwise be able to see from their vantage point. As described above, FIGS. 11A, 11B, 11C, and 11D illustrate an example of an X-ray view.

The rendering module 462 can be configured to request and receive updates to the position of the mobile device 120 from the mobile device 120 and/or the location server 150. The rendering module 462 can be configured to automatically receive updates from the mobile device 120 and/or the location server 150 when the position of the mobile device 120 changes. The rendering module 462 can be configured to receive updates from the mobile device 120 when the orientation of the mobile device changes 120. The rendering module 120 can be configured to automatically update the augmented view (directional view, X-ray view, or other augmented view) generated for display on the display 225 of the mobile device in response to changes to the position and/or the orientation of the mobile device 120 and to send the updated augmented view to the mobile device 120.

The point of interest (POI) module 464 can be configured to identify points of interest within the field of view of the mobile device 120 based on position and orientation information for the mobile device 120. The position information can be received from the mobile device 120 and/or the location server 150, and the orientation information can be received from the mobile device 120. The rendering module 462 can be configured to obtain the current position of the mobile device 120 within the indoor environment from the mobile device 120 and/or from the location server 150 and to provide the location of the mobile device 120 to the point of interest module 464. The rendering module 462 can also be configured to obtain the orientation information for the mobile device 120. The POI module 464 can be configured to operate similarly as the POI module 464 of the mobile device 120. The POI module 464 can be configured to use the position and orientation information to identify a set of one or more POIs that are in the direction of the field of view of the mobile device 120. As indicated above, the POIs may or may not be visible from the current position of the mobile device 120. The POI module 464 can be configured to order the set of POIs by their relative distance from the current position of the mobile device 120 and can be configured to mark each POI to indicate whether the POI may be visible from the current position of the mobile device 120 or whether the POI is obscured behind another component of the indoor environment.

The POI module 464 can be configured to access POI data from the navigation database 450 via the data access module 466. The data access module 466 can be configured to access the POI information for a particular indoor environment or portion of an indoor environment, such as a floor of the indoor environment, and to provide the POI data to the POI module 464. The navigation database 450 can include similar data as the navigation database 350 of the mobile device 120 as described above. The navigation database 450 can include POI information associated with POIs, including geometry information defining the boundaries of the POI and/or coordinates of the POI in either a global or self-defined, local coordinate system associated with an indoor environment. The POI information can also include images of the POIs that can be used to represent the POI in the X-ray view of the indoor environment and can include textual and/or graphical labels that can be used to represent the POI in the directional view of the indoor environment provided by the rendering engine 462.

The request processing module 468 can be configured to receive requests for information from a mobile device 120 and to send requested data to the mobile device 120. For example, the request processing module 468 can be configured to receive requests for augmented content for navigating through an indoor environment. The request processing module 468 can be configured to request information from the data access module 466 and/or the rendering module 462 if the requested information is not available in the navigation database 450. The request processing module 468 can also be configured to send the requested information to the mobile device 120 once the requested information has been provided by the data access module 466 and/or the rendering module 462.

The data access module 466 can be configured to access data stored in the memory 460 of the mobile device 120, the user roles database 475, and/or in the navigation database 450. The data access module 466 can be configured to access data stored in or to store data in the memory 460 and/or in the navigation database 450 in response to requests from the rendering module 462, the point of interest module 464, and/or other applications or modules implemented on the navigation server 125.

Figure 5:
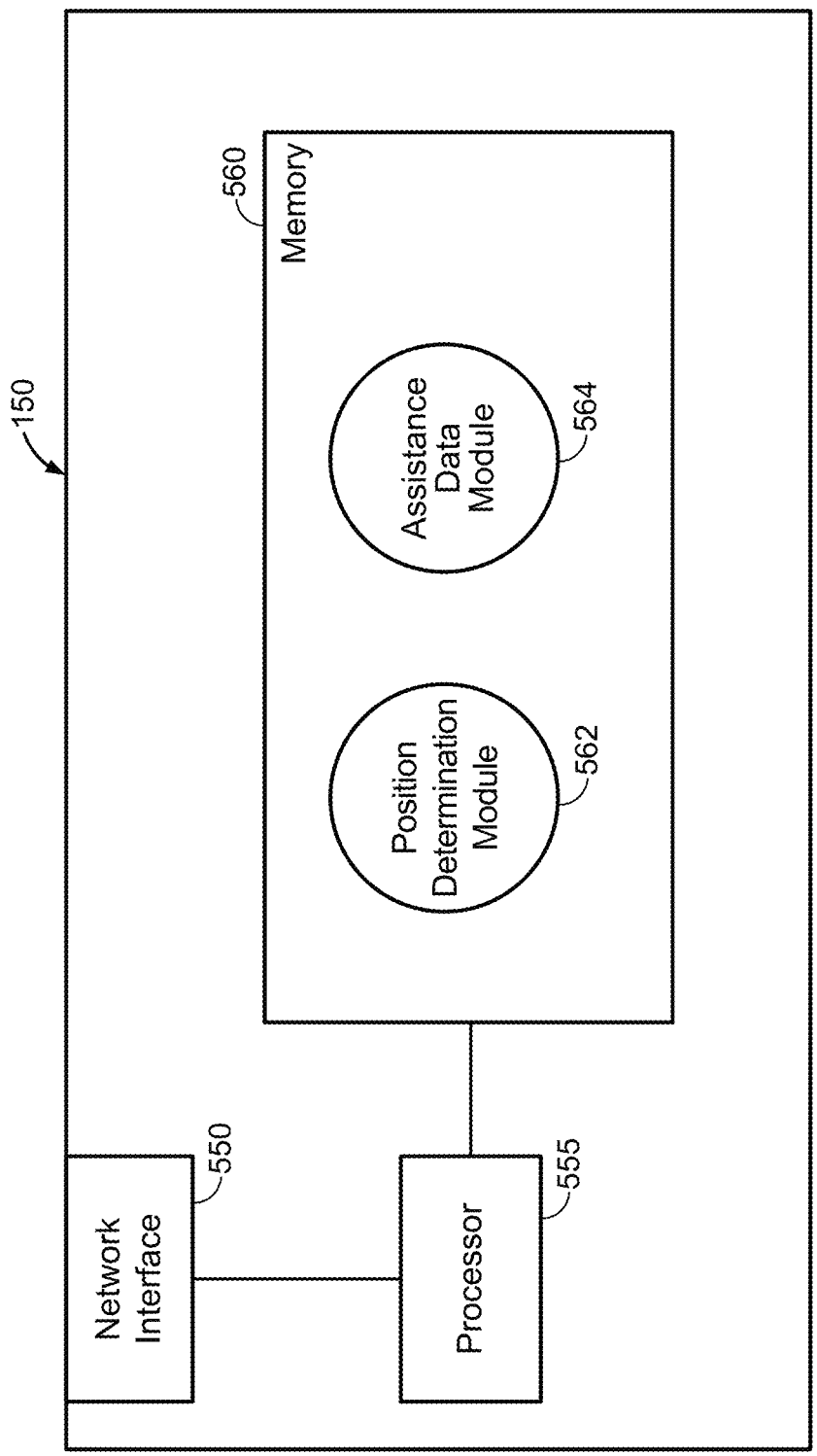
FIG. 5 is a functional block diagram of a computer system that can be used to implement the location server illustrated in FIG. 1.

FIG. 5 is a functional block diagram of a computer system that can be used to implement the location server 150 illustrated in FIG. 1. In the examples provided in the figures, the navigation server 125 and the location server 150 are illustrated as separate servers. However, in alternative implementations, some or all of the functionality of the navigation server 125 and the location server 150 may be implemented on the same server.

The location server 150 can include a processor 555, a network interface 550, and a memory 560. The location server 150 can also include functional modules that can be implemented as processor executable software code stored in memory 560. The functional modules illustrated in FIG. 5 can alternatively be stored either in part or in whole in a different computer-readable memory. For example, the functional modules may be stored in a removable computer-readable medium associated with the location server 150, such as a flash memory, a SD-Card, or other type of removable memory. The functional modules illustrated in FIG. 5 can also be implemented in part or in whole in firmware and/or hardware. The navigation server 125 can include a position determination module 562 and an assistance data module 564.

The processor 555 can be configured to execute software code stored in the memory 560. For example, the processor 555 can be configured to execute the software code associated with the position determination module 562 and the assistance data module 564. The processor 555 can also be configured to execute other software code used by the location server 150, such as operating system components, software drivers for peripheral devices, and/or other software code that may be executed by the location server 150 but the description of which is not required to understand the operation of the systems and methods disclosed herein.

The network interface 550 can be configured to provide bidirectional wireless and/or wired network communications to the location server 150. The network interface 550 can be configured to allow the location server 150 to communicate with mobile devices 120 via one or more intermediate networks, such as the Internet, a wireless network service provider's core network, one or more wireless local area networks (WLANs), and/or other types of network. The network communications between the network interface 550 of the location server 150 and the mobile devices 120 may be routed through one or more other network elements, such as wireless access point 115 or base station 140.

The memory 560 can comprise volatile and/or persistent memory for storing data used by various components of the location server 150. The memory 460 can be used to store processor-executable program code for one or more of the processors included in the location server 150, such as processor 555.

The position determination module 562 can be configured to provide location based services to mobile devices 120. For example, the position determination module 562 can be configured to determine the position of a mobile device 120 and/or provide assistance data to the mobile device 120 that can be used to determine the position of the mobile device 120 within an indoor environment and/or in an outdoor environment. For determining the position of a mobile device 120 within an indoor environment, the position determination module 562 can be configured to obtain from the mobile device 120 measurements of signals from a plurality of wireless access points 115 to estimate the location of the mobile device 120 within an indoor environment in various techniques, such as RSSI, RTT, TOA, and/or other techniques. The position determination module 562 can also be configured to determine the position of the mobile device 120 using signals received from a Satellite Positioning System receiver associated with the mobile device 120 (e.g., associated with communications controller 250) to determine the position of the mobile device 120 when outdoors and a line of site to a sufficient number of satellites from one or more SPS constellations.

The assistance data module 564 can be configured to identify assistance data that the mobile device 120 can use to determine the location of the mobile device 120. The assistance data module 564 can be configured to provide the mobile device 120 with an almanac of wireless access points 115 and/or base stations 140 which may be proximate to the mobile device 120. The mobile device 120 can use this information to identify wireless access points 115 and/or base stations 140 that may be proximate to the mobile device 120 and to use signals from nearby wireless access points 115 and/or base stations 140 to determine the position of the mobile device 120.

Figure 6:
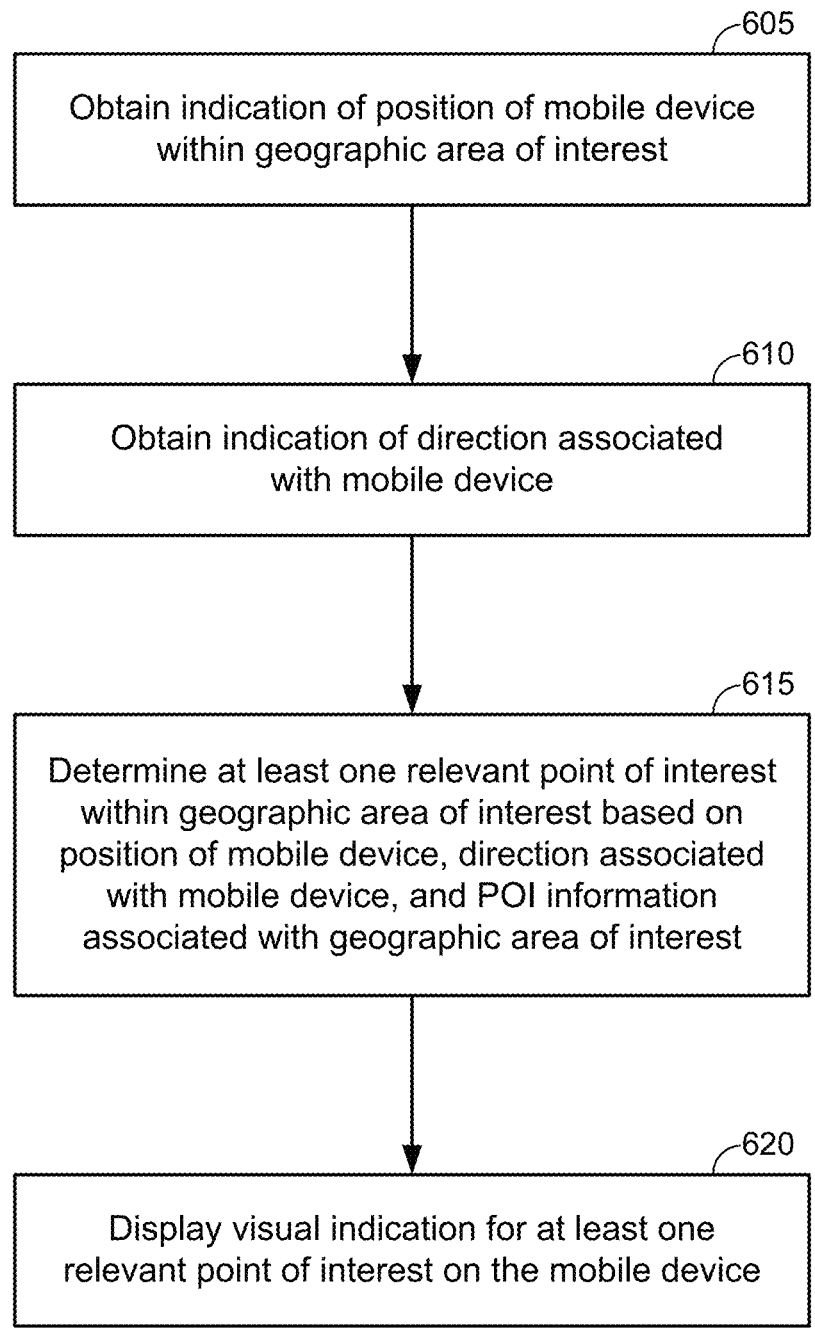
FIG. 6 is a block flow diagram of a process for displaying navigation information on a mobile device.

FIG. 6 is a block flow diagram of a process for displaying navigation information on a mobile device 120. The process illustrated in FIG. 6 can be implemented by the mobile device 120. However, some or all of the stages of the process illustrated in FIG. 6 can be implemented either in whole or in part by the navigation server 125 and/or the location server 150.

The process can begin with obtaining an indication of a position of the mobile device 120 within a geographical area of interest, such as an indoor environment (stage 605). The position of the mobile device 120 can be determined by the mobile device 120 and/or by the location server 150. For example, the position determination module 370 of the mobile device 120 can be configured to determine the location of the mobile device 120. The position determination module 370 can be configured to use signals from wireless access points 115 and/or base stations 140 to determine the location of the mobile device 120. The position determination module 370 can also be configured to use assistance data received from the location server 150 to determine the position of the mobile device 120. The position of the mobile device 120 can also be determined by the location server 150 and the location server 150 can be configured to send the position information to the mobile device 120.

An indication of the direction associated with the mobile device 120 can also be obtained (stage 610). The mobile device 120 can be configured to determine the orientation of the mobile device 120 based on sensor data collected by the orientation determination module 366. The orientation of the mobile device 120 can be used to determine how the mobile device 120 is oriented relative to the floor, walls, ceiling, and/or other elements of an indoor environment. Based on the orientation of the mobile device 120, it is possible to determine which POIs should fall within the field of view of the camera 225. The POIs may not necessarily be visible and may be behind walls, floors, ceilings, and/or other components of an indoor environment.

At least one relevant point of interest within the geographical region of interest can be determined based on the position of the mobile device 120, the direction associated with the mobile device 120, and POI information associated with the geographic area of interest (stage 615). Multiple POIs can be associated with a geographical area of interest. For example, an indoor environment, such as a shopping mall, can include POIs identifying the location of stores and restaurants and/or components of stores, such as cashier locations, the women's clothing section, menswear section, restroom facilities, changing rooms, and/or other aspects of a store that may be of interest of someone shopping at that location. In another example, POIs for a government building might include the location of the Department of Motor Vehicles, the County Recorder's Office, and the Department of Health and Human Safety. In yet another example, the POIs for an office building might include the location of a reception area or lobby, the location of restrooms, conference rooms, and/or specific companies if the building houses multiple tenants.

The at least one relevant point of interest can be determined using various techniques, including, but not limited to the process illustrated in FIG. 7, which is described in detail below. The at least one relevant point of interest can be determined by plotting a viewing direction or field of view of the camera 215 of the mobile device 120. The camera 215 of the mobile device 120 can be configured capture video and/or a series of images of the area within the field of view of the camera 215 and to display the captured content on the display 225 of the mobile device 120. The mobile device 120 can be configured to determine which POIs are within the field of view of the camera based on the position of the camera with in the geographic region of interest, e.g. an indoor environment and the direction that the mobile device 120 is facing. A set of one or more POIs that fall within the field of view of the camera 215 of the mobile device 120 can be selected from a set of POIs associated with a geographic area of interests, such as an indoor environment. The point of interest module 364 of the mobile device 120 can be configured to identify the set of one or more relevant POIs and/or the mobile device 120 can be configured to receive the POI information from the navigation server 125. The request processing module 468 of the navigation server 125 can be configured to receive a request for POI information from the mobile device 120. The mobile device 120 can be configured to provide the location and orientation information associated with the mobile device 120 to the navigation server 125 with the request for the POI information. The POI information can include geometry information defining the boundaries of the POI and/or coordinates of the POI in either a global or self-defined, local coordinate system associated with an indoor environment. The POI information can also include images of the POIs that can be used to represent the POI in the X-ray view of the indoor environment and can include textual and/or graphical labels that can be used to represent the POI.

A visual indication can then be displayed on the mobile device 120 for the at least one relevant point of interest (stage 620). The mobile device 120 can be configured to display a directional view, an X-ray view, or a combination thereof on the display of the mobile device 120. As described above, the directional view can provide an augmented view of an indoor environment that includes overlays of textual and/or graphical indications illustrating the position of POIs within the indoor environment relative to the position of the mobile device 120. The textual and/or graphical indications can be scaled in size relative to their distance from the position of the mobile device 120. Textual and/or graphical indications can also be displayed for POIs that fall within the field of view of the camera 215 but are not visible in the images and/or video content captured by the camera 215 because the POIs are blocked from view by one or more components of the indoor environment. The X-ray view can provide an augmented view of the indoor environment that can illustrate details of POIs that would otherwise be blocked by objects in the field of view of the mobile device 120, including components of the indoor environment and/or other POIs. The X-ray view can provide a view of images and/or video content captured by the camera 215 of the mobile device 120 composited with images of the POIs that would otherwise be blocked from view by components of the indoor environment, such as floors, doors, walls, ceilings, and/or other components of the indoor environment. The composite image can be formed by ordering the POIs based on their relative distances from the position of the mobile device 120 and assigning an alpha channel value to images associated with each POI based on the relative distance of the POI from the position of the mobile device 120. A composite image of the field of view of the mobile device 120 can then be rendered by compositing the field of view content captured by the camera 225 with the POI images, starting with those POIs farther from the current position of the mobile device 120.

FIG. 7 is a block flow diagram of a process for determining a relevant set of POIs. Aspects of the process illustrated in FIG. 7 can be implemented by the mobile device 120 and/or by the navigation server 125. The process illustrated in FIG. 7 can be used to implement, at least in part, stage 615 of the process illustrated in FIG. 6.

An eye ray associated with the position and the indication of direction of the mobile device 120 can be determined (stage 705). The eye ray can comprise imaginary line extending from the position of the mobile device 120 in the direction associated with the indication of direction obtained for the mobile device 120 in stage 610 of the process illustrated in FIG. 6. The eye ray can be used to determine which POIs could fall within the field of view of the camera 215 of the mobile device 120. The eye ray can also be used to determine which POIs could fall within the field of view of the camera 215 of the mobile device 120 if the camera 215 were able to peer through physical barriers in the geographic area of interest, such as floors, walls, ceilings, and other objects to view POIs that would otherwise be obscured.

In some implementations, the eye ray can be projected from a position centered at the position of the mobile device 120. In some implementations, the height of mobile device 120 above the floor or ground plane of the geographic area of interest can be taken into account when determining the eye ray. For example, the sensors 205 of the mobile device 120 may include one or more sensors that are capable of determining the altitude of the mobile device 120. The mobile device 120 and/or the navigation server 125 can also be configured to determine an altitude of the mobile device 120 based on RSSI, RTT, and/or measurement of signals transmitted between the mobile device 120 and one or more wireless access points 115, base stations 140, or other mobile devices 120 at a known position. In some implementations, a default average value can be used for the height from the floor based on an average height for the typical user of a mobile device 120 and/or a typical height at which an average user would hold the mobile device 120 above the floor or ground plane of a geographic area of interest when using the mobile device 120 to navigate through the geographic area of interest.

In some implementations, multiple eye rays can be determined and projected through the geometric representation of the geographic area of interest. Sometimes a single eye ray may not be sufficient to identify all of the POIs that fall within the field of view. Accordingly, multiple eye rays may be determined to provide more complete information about which POIs that fall within the field of view of the mobile device 120 (and consequently a user of the mobile device 120). In some implementations, multiple eye rays can be determined by uniformly sampling the angle of the field of view, and an intersection test similar to that used for the single eye ray example can be used to determine whether any of the eye rays intersection with a POI. If one or more eye rays intersect with a POI, that POI can be displayed in the augmented view of the region of geographic interest presented on the display of the mobile device 120.

The eye ray can then be projected through a geometric representation of the geographic area of interest (stage 710). As described above, each of the POIs can be associated with POI information that can include geometry information defining the boundaries of the POI and/or coordinates of the POI in either a global or self-defined, local coordinate system associated with an indoor environment. The geometry information can provide information defining 2D boundaries for a particular POI or can provide 3D boundaries of associated with the POI. In some implementations, an area of geographic interest can comprise a multistory building or buildings and the eye-ray can be projected across multiple floors of a multistory environment to determine whether the eye-ray intersects with one or more POIs on multiple floors of the multistory environment.

At least one POI with which the eye ray intersects can be identified (stage 715). Based on the projection of the eye-ray through the geographic area of interest, POIs with which the eye ray intersections can be selected as relevant points of interest. The eye ray can be used to represent what the field of view of the camera might include if the camera 215 could view peer through physical barriers and/or objects in the geographical area of interest. The POIs identified using the process illustrated in FIG. 7 can be displayed on the display 225 of the mobile device 120 to provide a user of the mobile device 120 with contextual information that may be useful for navigating through the geographic area of interest.

The POI information can include geometry information defining the boundaries of the POI and/or coordinates of the POI in either a global or self-defined, local coordinate system associated with an indoor environment. The POI information can be used to determine how far each of the POIs are from the current position of the mobile device 120 and the POIs can be sorted based on that distance from the current position of the mobile device 120.

FIG. 8 is a block flow diagram of a process for determining displaying on the display 225 of the mobile device 120 a directional view of relevant POIs within a field of view of a camera 215 of a mobile device 120. The process illustrated in FIG. 8 can be implemented by the mobile device 120 and/or by the navigation server 125. The process illustrated in FIG. 7 can be used to implement, at least in part, stage 620 of the process illustrated in FIG. 6. FIG. 10, described above, provides an example of a mobile device 120 displaying directional view of a geographical area of interest that comprises an indoor shopping mall.

The POIs identified based on the position and direction of the mobile device 120 can be sorted based on their distance from the mobile device 120 (stage 805). Each of the POIs can be associated with POI information The POI information can include geometry information defining the boundaries of the POI and/or coordinates of the POI in either a global or self-defined, local coordinate system associated with an indoor environment. The POI information can be used to determine how far each of the POIs are from the current position of the mobile device 120 and the POIs can be sorted based on that distance from the current position of the mobile device 120.

Textual and/or graphical indications associated with the POIs can then be rendered (stage 810). The POI information associated with each of the POIs can include textual and/or graphical indications that can be rendered to represent that POI. For example, the POI information can contain textual information, such as a name or description of the POI. In one example implementation, the directional view can be provided for an indoor shopping mall, and the POIs can be associated with textual indications, such as a store or restaurant name and/or a description of the POI (e.g., fitting rooms, restrooms, etc.). The POI information can also include graphical indications, such as a store or restaurant logo or an icon representing a type of retailer (e.g. clothing, department store, furniture, shoes, appliances, etc.). In another example implementation, the POI information can be associated with an office building where the textual and/or graphical indications can be customized for an office environment. In such an implementation, the POI information can include textual and/or graphical indications identifying specific business and/or portions of a business, such as copy rooms, break rooms, conference rooms, supply rooms, etc.

The textual and/or graphical indications can be rendered as an overlay over images and/or video content captured by the camera 215 of the mobile device 120 to create an augmented view of the geographic area of interest within the field of view of the camera. In some implementations, the size of the textual and/or graphical indications rendered in the augmented view can be based how close the POI associated with the textual and/or graphical indications is to the current position of the mobile device 120. The textual and/or graphical indications can be rendered larger if the POI is closer to the current position of the mobile device 120 and the textual and/or graphical indications can be rendered smaller if the POI is farther from the position of the mobile device 120.

In some implementations, the POI may be obscured in the field of view in the images and/or video content by one or more obstacles between the current position of the camera and the position of the POI, but textual and/or graphical indications can be displayed for such POIs to provide the user of the mobile device 120 with contextual information about the current position of the mobile device 120. For example, a wall, floor, ceiling, or other component of the building may obscure the POI from the camera 215 at the current position of the mobile device 120. In another example, one or more objects within the region of interest, such as people, fixtures within a store, etc. that are not structural components of a building could also obscure the POI from the field of view of the camera 215 of the mobile device, but textual and/or graphical indications could still be provided to guide a user of the mobile device 120 toward the obscured POIs. In some implementations, the rendering module 362 of the mobile device and/or the rendering module 462 of the navigation server 125 can be configured to render the textual and/or graphical indications associated with POIs that are obstructed from view by one or more components of a building or other indoor environment as partially transparent to indicate to a user of the mobile device 120 that the POI is obscured by components of the building or other indoor environment. The POIs that are obstructed from view by components of the indoor environment can be identified based on the current position of the mobile device 120, the direction that the mobile device 120 is facing and/or the orientation of the device, 2D or 3D map information for an indoor environment, and POI information defining the geometry of the POIs within the indoor environment.

In some implementations, the sorting of stage 805 can be optional and the textual and/or graphical indications associated with the POIs can then be rendered based on their relative distance from the current position of the mobile device 120 without first sorting the POIs.

The rendered indications associated with the POIs can then be displayed with representation of geographic area of interest (stage 815). The rendered textual and/or graphical indications associated with the POIs can be displayed on the display 225 of the mobile device 120. In some implementations, the rendered textual and/or graphical indications can be displayed as an overlay to the image and/or video content captured of the field of view of the camera 215. In other implementations, the rendering module 362 of the mobile device 120 and/or the rendering module 462 of the navigation server can be configured to generated image and/or video content for display on the display 225 that incorporates the textual and/or graphical indications associated with the POIs with the image and/or video content of the field of view of the camera 215 of the mobile device 120. The latter approach can be used where the rendered textual and/or graphical indications are associated with a level of transparency and are not rendered completely as a complexly opaque overlay to the content captured by the camera 215.

Figure 9:
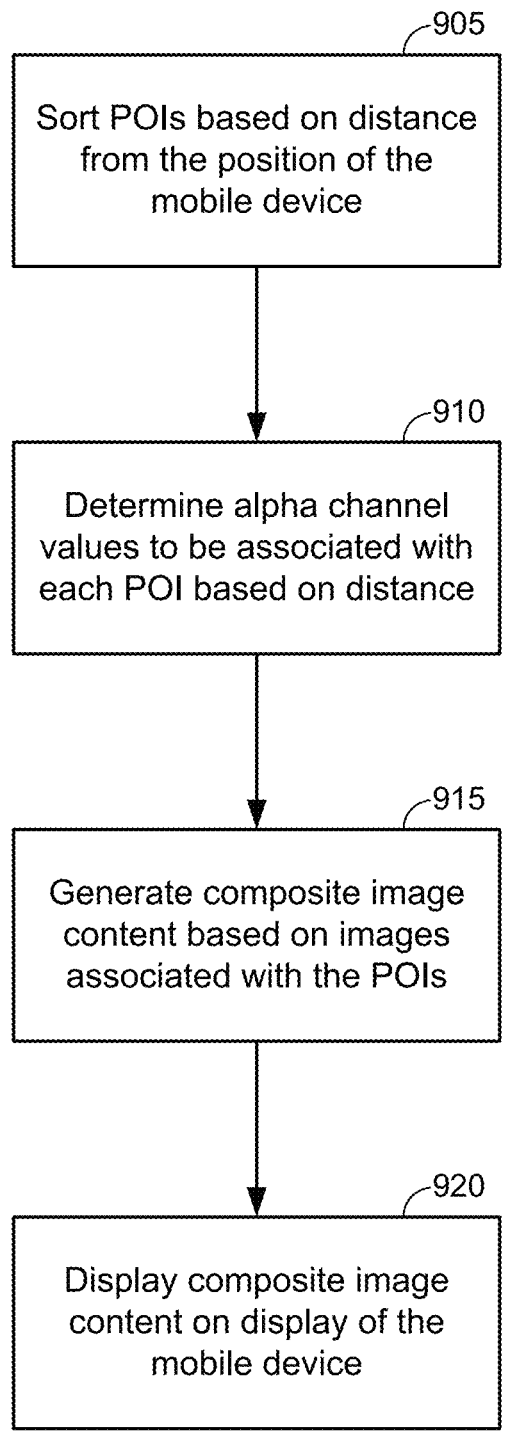
FIG. 9 is a block flow diagram of a process for determining displaying an X-ray view of points of interest within a field of view of a camera of a mobile device on a display of the mobile device.

FIG. 9 is a block flow diagram of a process for determining displaying an X-ray view of POIs within a field of view of a camera 215 of a mobile device 120 on a display 225 of the mobile device 120. The process illustrated in FIG. 8 can be implemented by the mobile device 120 and/or by the navigation server 125. The process illustrated in FIG. 7 can be used to implement, at least in part, stage 620 of the process illustrated in FIG. 6.

The POIs identified based on the position and direction of the mobile device 120 can be sorted based on their distance from the mobile device 120 (stage 905). Each of the POIs can be associated with POI information The POI information can include geometry information defining the boundaries of the POI and/or coordinates of the POI in either a global or self-defined, local coordinate system associated with an indoor environment. The POI information can be used to determine how far each of the POIs are from the current position of the mobile device 120 and the POIs can be sorted based on that distance from the current position of the mobile device 120.

An alpha channel value can be determined for each of the POIs based on the distance of the POI from the position of the mobile device 120 (stage 910). In some implementations, the sorting of stage 905 can be optional and an alpha channel value can be determined for each POI based on its relative distance from the current position of the mobile device 120. The alpha channel value associated with each of the POIs can indicate how transparent (or conversely how opaque) indications associated with a particular POI should be rendered. In some implementations, the alpha channel values can be determined such that indications associated with POIs that are within a predetermined distance from the position of the mobile device 120 are rendered as opaque, while the indications associated with those POIs that are farther than the predetermined distance from the position of the mobile device 120 are rendered as increasingly transparent the farther the POI is from the position of the mobile device 120. A threshold distance can also be defined beyond which indications associated with POIs at or beyond that distance are not rendered at all (e.g., rendered at 100% transparency).

Composite image content can be generated based on the image associated with POI, the sort order of the POIs, and the alpha channel values associated with each of the POIs (stage 915). For example, each of the POIs can be associated with an image of the POI or other graphical representation of the POI. The composite image content can be generated by combining the textual and/or graphical indicia associated with each of the POIs with image and/or video content of the field of the view of the mobile device 120 captured by the camera 215. In one example implementation, the image and/or video content of the field of view of the mobile device 120 captured by the camera can be associated with a predetermined transparency level and the textual and/or graphical indications associated with each of the POIs can then be rendered over the image and/or video content of the field of view of the mobile device 120 captured by the camera. In some implementations, the textual and/or graphical indications associated with the POIs can be rendered based on the distance of each of the POIs from the position of the mobile device 120, starting with the POIs that is farthest from the position of the mobile device 120 first and ending with the POI that is closes to the position of the mobile device 120.

The composite image content can then be displayed on the display 225 of the mobile device 120 (stage 920). The composite augmented view of the field of view of the camera that includes the indications of the POI rendered in stage 915 can be displayed on the display 225 of the mobile device 120 to provide an X-ray view of a geographical area of interest.

Other Considerations

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

A wireless communication network does not have all communications transmitted wirelessly, but is configured to have at least some communications transmitted wirelessly.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

Further, more than one invention may be disclosed.

Substantial variations to described configurations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

What is claimed is:

1. A method of generating one or more augmented views, the method comprising:
    determining a plurality of points of interest within a geographic area of interest based on a field of view of a camera;
    obtaining an image of a portion of the geographic area of interest captured using the camera;
    obtaining a first image associated with a first point of interest from at least one database, the first point of interest being disposed within the portion of the geographic area of interest;
    obtaining a second image associated with a second point of interest from the at least one database, the second point of interest being disposed within the portion of the geographic area of interest;
    generating an augmented view including a composite image of at least the portion of the geographic area, wherein generating the augmented view includes:
        overlaying, at a first transparency level, the first image over the image of the portion of the geographic area of interest; and
        overlaying, at a second transparency level, the second image over the image of the portion of the geographic area of interest, wherein the first image is displayed as being in front of at least a portion of the second image based on the first point of interest being disposed at least partially behind the second point of interest in the geographic area of interest relative to the camera, the second transparency level of the second image being different than the first transparency level of the first image; and
    displaying, on a mobile device, the augmented view.

2. The method of claim 1, wherein at least a portion of the first image does not overlap at least a portion of the second image.

3. The method of claim 1, wherein at least one of the first image or the second image has a size that is dependent on a distance from a mobile device of at least one of the first point of interest or the second point of interest.

4. The method of claim 1, wherein the second transparency level has a lower transparency than the first transparency level.

5. The method of claim 1, wherein one or more visual indications associated with one or more points of interest that are not visible in the field of view of the camera are displayed as at least partially transparent based on the one or more points of interest being at least partially obstructed from view by one or more objects in the geographic area of interest.

6. The method of claim 1, wherein a transparency level of at least one of the first image or the second image is dependent on a presence of one or more physical barriers between a mobile device and at least one of the first point of interest or the second point of interest.

7. The method of claim 1, wherein at least one of the first image or the second image is displayed as opaque based on at least one of the first point of interest or the second point of interest being visible in the field of view.

8. The method of claim 1, further comprising generating an updated augmented view, wherein at least one of the first transparency level of the first image or the second transparency level of the second image is adjusted in the updated augmented view based on movement of the camera relative to at least one of the first point of interest or the second point of interest.

9. The method of claim 1, wherein the geographic area of interest comprises an indoor environment.

10. The method of claim 9, wherein the mobile device is in the indoor environment, wherein the second point of interest is in the indoor environment, and wherein the first point of interest is outside of the indoor environment.

11. The method of claim 1, wherein the mobile device is in a first indoor environment, wherein the second point of interest is in the first indoor environment, and wherein the first point of interest is in a second indoor environment.

12. The method of claim 1, wherein the first transparency level of the first image and the second transparency level of the second image are based on the first point of interest being disposed at least partially behind the second point of interest in the geographic area of interest.

13. The method of claim 1, wherein the first point of interest is disposed within the portion of the geographic area of interest at a first distance from the mobile device and the second point of interest is disposed within the portion of the geographic area of interest at a second distance from the mobile device, and wherein the first transparency level of the first image is based on the first distance and the second transparency level of the second image is based on the second distance.

14. The method of claim 1, wherein the first point of interest is disposed within the portion of the geographic area of interest at a distance from the second point of interest, and wherein the first transparency level of the first image and the second transparency level of the second image are based on the distance.

15. The method of claim 1, wherein the first point of interest is disposed within the portion of the geographic area of interest at a first distance from the mobile device and the second point of interest is disposed within the portion of the geographic area of interest at a second distance from the mobile device, and wherein the first image is displayed as being in front of at least the portion of the second image based on the first distance being greater than the second distance.

16. The method of claim 1, wherein the first image and the second image are different images captured using one or more image capture devices.

17. The method of claim 1, wherein the first image and the second image are captured using a same image capture device.

18. An apparatus for generating one or more augmented views, comprising:
a memory configured to store one or more images; and
a processor configured to:
  determine a plurality of points of interest within a geographic area of interest based on a field of view of a camera;
  obtain an image of a portion of the geographic area of interest captured using the camera;
  obtain a first image associated with a first point of interest from at least one database, the first point of interest being disposed within the portion of the geographic area of interest;
  obtain a second image associated with a second point of interest from the at least one database, the second point of interest being disposed within the portion of the geographic area of interest;
  generate an augmented view including a composite image of at least the portion of the geographic area, wherein generating the augmented view includes:
    overlaying, at a first transparency level, the first image over the image of the portion of the geographic area of interest; and
    overlaying, at a second transparency level, the second image over the image of the portion of the geographic area of interest, wherein the first image is displayed as being in front of at least a portion of the second image based on the first point of interest being disposed at least partially behind the second point of interest in the geographic area of interest relative to the camera, the second transparency level of the second image being different than the first transparency level of the first image; and
a display for displaying the augmented view.

19. The apparatus of claim 18, wherein at least a portion of the first image does not overlap at least a portion of the second image.

20. The apparatus of claim 18, wherein the second transparency level has a lower transparency than the first transparency level.

21. The apparatus of claim 18, wherein one or more visual indications associated with one or more points of interest that are not visible in the field of view of the camera are displayed as at least partially transparent based on the one or more points of interest being at least partially obstructed from view by one or more objects in the geographic area of interest.

22. The apparatus of claim 18, wherein a transparency level of at least one of the first image or the second image is dependent on a presence of one or more physical barriers between the apparatus and at least one of the first point of interest or the second point of interest.

23. The apparatus of claim 18, wherein at least one of the first image or the second image is displayed as opaque based on at least one of the first point of interest or the second point of interest being visible in the field of view.

24. The apparatus of claim 18, wherein the processor is further configured to generate an updated augmented view, wherein at least one of the first transparency level of the first image or the second transparency level of the second image is adjusted in the updated augmented view based on movement of the camera relative to at least one of the first point of interest or the second point of interest.

25. The apparatus of claim 18, wherein the geographic area of interest comprises an indoor environment, wherein the apparatus is in the indoor environment, wherein the second point of interest is in the indoor environment, and wherein the first point of interest is outside of the indoor environment.

26. The apparatus of claim 18, wherein the apparatus is in a first indoor environment, wherein the second point of interest is in the first indoor environment, and wherein the first point of interest is in a second indoor environment.

27. The apparatus of claim 18, wherein the first transparency level of the first image and the second transparency level of the second image are based on the first point of interest being disposed at least partially behind the second point of interest in the geographic area of interest.

28. The apparatus of claim 18, wherein the first point of interest is disposed within the portion of the geographic area of interest at a first distance from the apparatus and the second point of interest is disposed within the portion of the geographic area of interest at a second distance from the apparatus, and wherein the first transparency level of the first image is based on the first distance and the second transparency level of the second image is based on the second distance.

29. The apparatus of claim 18, wherein the first point of interest is disposed within the portion of the geographic area of interest at a first distance from the apparatus and the second point of interest is disposed within the portion of the geographic area of interest at a second distance from the apparatus, and wherein the first image is displayed as being in front of at least the portion of the second image based on the first distance being greater than the second distance.

30. The apparatus of claim 18, further comprising:
a camera for capturing the one or more images.

31. The apparatus of claim 18, wherein the apparatus comprises a mobile device with a camera for capturing pictures.

32. The apparatus of claim 18, wherein the first image and the second image are images captured using one or more image capture devices.

33. The apparatus of claim 18, wherein the first image and the second image are captured using a same image capture device.

* * * * *